United States Patent
Agnes et al.

(10) Patent No.: US 7,091,642 B2
(45) Date of Patent: *Aug. 15, 2006

(54) FIELD ASSEMBLY FOR A MOTOR AND METHOD OF MAKING SAME

(75) Inventors: Michael Agnes, Bel Air, MD (US); Allyn Boyce, Baldwin, MD (US); Hung Du, Reisterstown, MD (US); Earl Ortt, Bel Air, MD (US); Brandon Verbrugge, Towson, MD (US); Richard H. Walter, Baldwin, MD (US); Ren T. Wang, Timonium, MD (US)

(73) Assignee: Black & Decker Inc., Newark, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/113,429

(22) Filed: Apr. 22, 2005

(65) Prior Publication Data

US 2005/0184610 A1   Aug. 25, 2005

Related U.S. Application Data

(62) Division of application No. 10/468,643, filed as application No. PCT/US02/05029 on Feb. 22, 2002.

(60) Provisional application No. 60/271,141, filed on Feb. 23, 2001.

(51) Int. Cl.
*H02K 21/26* (2006.01)
*H02K 21/38* (2006.01)
*H02K 5/24* (2006.01)

(52) U.S. Cl. .......................... 310/154.12; 310/154.13; 310/43; 29/596; 29/597; 29/598

(58) Field of Classification Search .......... 310/154.01, 310/154.03, 154.06–154.13, 156.08, 156.12, 310/156.21, 43; 29/596–598
See application file for complete search history.

(56) References Cited

U.S. PATENT DOCUMENTS 787,184 A    4/1905  Jacobson
(Continued)

FOREIGN PATENT DOCUMENTS

DE    6 601 157    2/1969
(Continued)

OTHER PUBLICATIONS

Composite magnet holder simplifies motor assembly. Retrieved Nov. 26, 2001 from http://www.machinedesign.com/content/columns/articleloader.asp?main=sitesearch &origA.
(Continued)

*Primary Examiner*—Tran Nguyen
(74) *Attorney, Agent, or Firm*—Harness, Dickey & Pierce, P.L.C.

(57) ABSTRACT

A cylinder/magnet assembly for a field of an electric machine, such as a stator of a brush type motor or a rotor of a brushless motor, alternator or generator, is formed by stamping a blank to form anchors extending upwardly from a surface of the blank and stamping holes in the blank where first and second portions of the anchors meet an inner surface of the cylinder to facilitate rolling of the cylinder from the blank. After a cylinder is rolled from the blank, pre-formed magnets are placed around an inner surface of the cylinder and plastic molded around the magnets and anchors to secure the magnets to the cylinder. In an aspect of the invention, the holes act as magnetic chokes. In another aspect of the invention, the anchors are formed as flux spreaders. In another aspect of the invention, the north and south poles of a cylinder and magnet assembly have unequal distribution angles. In another aspect of the invention, the north and south poles of a cylinder and magnet assembly have unequal numbers of magnets. In another aspect of the invention, flux spreaders are disposed on inner surfaces of the magnets of each pole of a cylinder and magnet assembly. In another aspect of the invention, the foregoing aspects are used in a stator of a motor. In another aspect of the invention, such a stator is used in a power tool.

21 Claims, 13 Drawing Sheets

U.S. PATENT DOCUMENTS

| | | | |
|---|---|---|---|
| 3,258,623 A | 6/1966 | Phelon et al. | |
| 3,296,471 A | 1/1967 | Cochardt | |
| 3,390,291 A | 6/1968 | Eberline et al. | |
| 3,422,294 A | 1/1969 | Parker | |
| 3,436,815 A | 4/1969 | Sheets | |
| 3,445,692 A | 5/1969 | Kato | |
| 3,445,693 A | 5/1969 | Crawshaw et al. | |
| 3,510,707 A | 5/1970 | Stone | |
| 3,693,037 A * | 9/1972 | West | 310/154.08 |
| 3,710,291 A | 1/1973 | Nicoud | |
| 3,766,418 A | 10/1973 | Apostoleris | |
| 3,789,250 A | 1/1974 | Macoit et al. | |
| 3,887,826 A | 6/1975 | Apostoleris | |
| 4,012,651 A | 3/1977 | Burson | |
| 4,015,154 A | 3/1977 | Tanaka et al. | |
| 4,155,021 A | 5/1979 | Corbach et al. | |
| 4,159,562 A | 7/1979 | Liptak et al. | |
| 4,209,724 A | 6/1980 | Periou | |
| 4,219,752 A | 8/1980 | Katou | |
| 4,260,916 A | 4/1981 | Theissig | |
| 4,323,806 A | 4/1982 | Aoki | |
| 4,383,192 A | 5/1983 | Sikorra | |
| 4,453,097 A | 6/1984 | Lordo | |
| 4,464,595 A | 8/1984 | Hamano et al. | |
| 4,573,258 A | 3/1986 | Ito et al. | |
| 4,591,749 A | 5/1986 | Gauthier et al. | |
| 4,594,525 A | 6/1986 | Stokes | |
| 4,625,392 A | 12/1986 | Stokes | |
| 4,665,333 A | 5/1987 | Heim et al. | |
| 4,683,393 A | 7/1987 | Stokes | |
| 4,724,348 A | 2/1988 | Stokes | |
| 4,757,603 A | 7/1988 | Stokes | |
| 4,769,624 A | 9/1988 | Merritt et al. | |
| 4,777,717 A | 10/1988 | Okamoto | |
| 4,792,712 A | 12/1988 | Stokes | |
| 4,793,054 A | 12/1988 | Abbratozzato et al. | |
| 4,795,932 A | 1/1989 | Long | |
| 4,801,834 A | 1/1989 | Stokes | |
| 4,827,173 A | 5/1989 | Corbach et al. | |
| 4,850,100 A | 7/1989 | Stokes | |
| 4,873,461 A | 10/1989 | Brennan et al. | |
| 4,877,986 A | 10/1989 | Shimizu | |
| 4,879,485 A | 11/1989 | Tassinario | |
| 4,910,861 A | 3/1990 | Dohogne | |
| 4,916,344 A | 4/1990 | Hammer et al. | |
| 4,918,801 A | 4/1990 | Schwarz et al. | |
| 4,953,284 A | 9/1990 | Hammer et al. | |
| 4,954,736 A | 9/1990 | Kawamoto et al. | |
| 4,973,872 A | 11/1990 | Dohogne | |
| 5,038,460 A | 8/1991 | Ide et al. | |
| 5,075,605 A | 12/1991 | Hendricks et al. | |
| 5,121,021 A | 6/1992 | Ward | |
| 5,264,749 A | 11/1993 | Maeda et al. | |
| 5,268,607 A | 12/1993 | McManus | |
| 5,341,561 A | 8/1994 | Schorm et al. | |
| 5,353,491 A | 10/1994 | Gentry et al. | |
| 5,475,276 A | 12/1995 | Shiga et al. | |
| 5,584,114 A | 12/1996 | McManus | |
| 5,646,467 A | 7/1997 | Floresta et al. | |
| 5,705,970 A | 1/1998 | Nishida et al. | |
| 5,714,827 A | 2/1998 | Hansson | |
| 5,731,646 A | 3/1998 | Heinze et al. | |
| 5,806,169 A | 9/1998 | Trago et al. | |
| 5,811,908 A | 9/1998 | Iwata et al. | |
| 5,828,152 A | 10/1998 | Takeda et al. | |
| 5,831,364 A | 11/1998 | Buse | |
| 5,845,389 A | 12/1998 | Roberts et al. | |
| 5,861,695 A * | 1/1999 | Brassard | 310/156.43 |
| 5,874,794 A | 2/1999 | Trammell et al. | |
| 5,942,827 A | 8/1999 | Neumann et al. | |
| 5,960,532 A | 10/1999 | Hill | |
| 5,998,902 A | 12/1999 | Sleder, Sr. et al. | |
| 6,002,185 A | 12/1999 | Nakao et al. | |
| 6,006,416 A | 12/1999 | Katagiri | |
| 6,020,661 A | 2/2000 | Trago et al. | |
| 6,058,594 A | 5/2000 | Neumann et al. | |
| 6,060,799 A | 5/2000 | McManus et al. | |
| 6,177,751 B1 | 1/2001 | Suzuki et al. | |
| 6,191,516 B1 | 2/2001 | Froehlich et al. | |
| 6,281,612 B1 | 8/2001 | Asao et al. | |
| 6,515,389 B1 * | 2/2003 | Hartz | 310/154.08 |
| 6,522,042 B1 * | 2/2003 | Du et al. | 310/154.03 |

FOREIGN PATENT DOCUMENTS

| | | | |
|---|---|---|---|
| DE | 19 41 169 C2 | 4/1970 | |
| DE | 1 909 063 | 1/1971 | |
| DE | 23 02 947 C2 | 8/1973 | |
| DE | 23 42 499 | 3/1975 | |
| DE | 76 08 871 | 7/1976 | |
| DE | 25 05 937 A1 | 8/1976 | |
| DE | 75 04 284 | 10/1977 | |
| DE | 28 27 068 C2 | 1/1979 | |
| DE | 27 35 778 | 3/1979 | |
| DE | 28 35 441 A1 | 2/1980 | |
| DE | 28 55 986 | 7/1980 | |
| DE | 30 23 743 A1 | 1/1982 | |
| DE | 31 35 217 A1 | 4/1983 | |
| DE | 84 27 703 U1 | 3/1986 | |
| DE | 35 10 845 A1 | 10/1986 | |
| DE | 39 13 618 C2 | 11/1989 | |
| DE | 40 33 454 A1 | 4/1992 | |
| DE | 42 13 374 A1 | 10/1993 | |
| DE | 42 40 995 A1 | 6/1994 | |
| DE | 195 17 668 A1 | 11/1996 | |
| DE | 197 05 432 A1 | 8/1998 | |
| DE | 198 61 024 | 9/1999 | |
| DE | 196 14 217 | 5/2000 | |
| DE | 199 11 261 C2 | 9/2000 | |
| DE | 199 42 029 A1 | 3/2001 | |
| DE | 199 51 594 | 5/2001 | |
| DE | 101 03 434 | 8/2001 | |
| DE | 100 09 151 C2 | 9/2001 | |
| DE | 100 51 308 A1 | 10/2001 | |
| DE | 100 53 692 A1 | 5/2002 | |
| DE | 101 00 717 | 7/2002 | |
| DE | 101 18 275 | 10/2002 | |
| DE | 102 16 098 | 10/2003 | |
| DE | 102 19 190 | 11/2003 | |
| DE | 102 24 867 | 12/2003 | |
| DE | 203 13 943 | 2/2004 | |
| EP | 0 143 693 A2 | 6/1985 | |
| EP | 0 218 477 A2 | 4/1987 | |
| EP | 0 410 048 B1 | 1/1991 | |
| EP | 0 505 498 B1 | 9/1992 | |
| EP | 0 558 746 B1 | 9/1993 | |
| EP | 0 569 594 B1 | 11/1993 | |
| EP | 0 809 878 B1 | 10/1998 | |
| FR | 1 588 988 | 3/1970 | |
| FR | 2 445 053 | 7/1980 | |
| FR | 2 518 927 | 7/1983 | |
| FR | 2 625 852 * | 1/1988 | 310/154.35 |
| FR | 2 617 344 | 12/1988 | |
| FR | 2617344 | 12/1988 | |
| GB | 1 389 519 | 11/1973 | |
| GB | 1 576 917 | 10/1980 | |
| GB | 2202170 | 9/1988 | |
| JP | 50-68807 | 6/1975 | |
| JP | 54-164828 | 11/1979 | |
| JP | 55-56476 | 4/1980 | |
| JP | 64-64546 | 3/1989 | |
| JP | 3-77247 | 8/1991 | |
| JP | 3-265437 | 11/1991 | |
| JP | 3-293943 | 12/1991 | |

| | | |
|---|---|---|
| JP | 09039027 | 2/1997 |
| JP | 10-256031 | 9/1998 |
| JP | 11-299147 | 10/1999 |
| JP | 2000-152535 | 5/2000 |
| JP | 2000-324733 | 11/2000 |
| JP | 2001-69703 | 3/2001 |
| JP | 2001-169485 | 6/2001 |
| WO | WO/97 05687 | 2/1997 |
| WO | WO 97/45917 | 12/1997 |
| WO | WO 01/56134 | 8/2001 |
| WO | WO 01/080400 | 10/2001 |

OTHER PUBLICATIONS

European Search Report EP 1237252 A3.

International Search Report PCT/US02/05029, ISA/US—mailed Sep. 6, 2002.

SEMONES, Burley C., Application of high-energy permanent-magnet materials to servomotors, J. Appl. Phys. 57(1), Apr. 15, 1985, pp. 3817-3819.

* cited by examiner

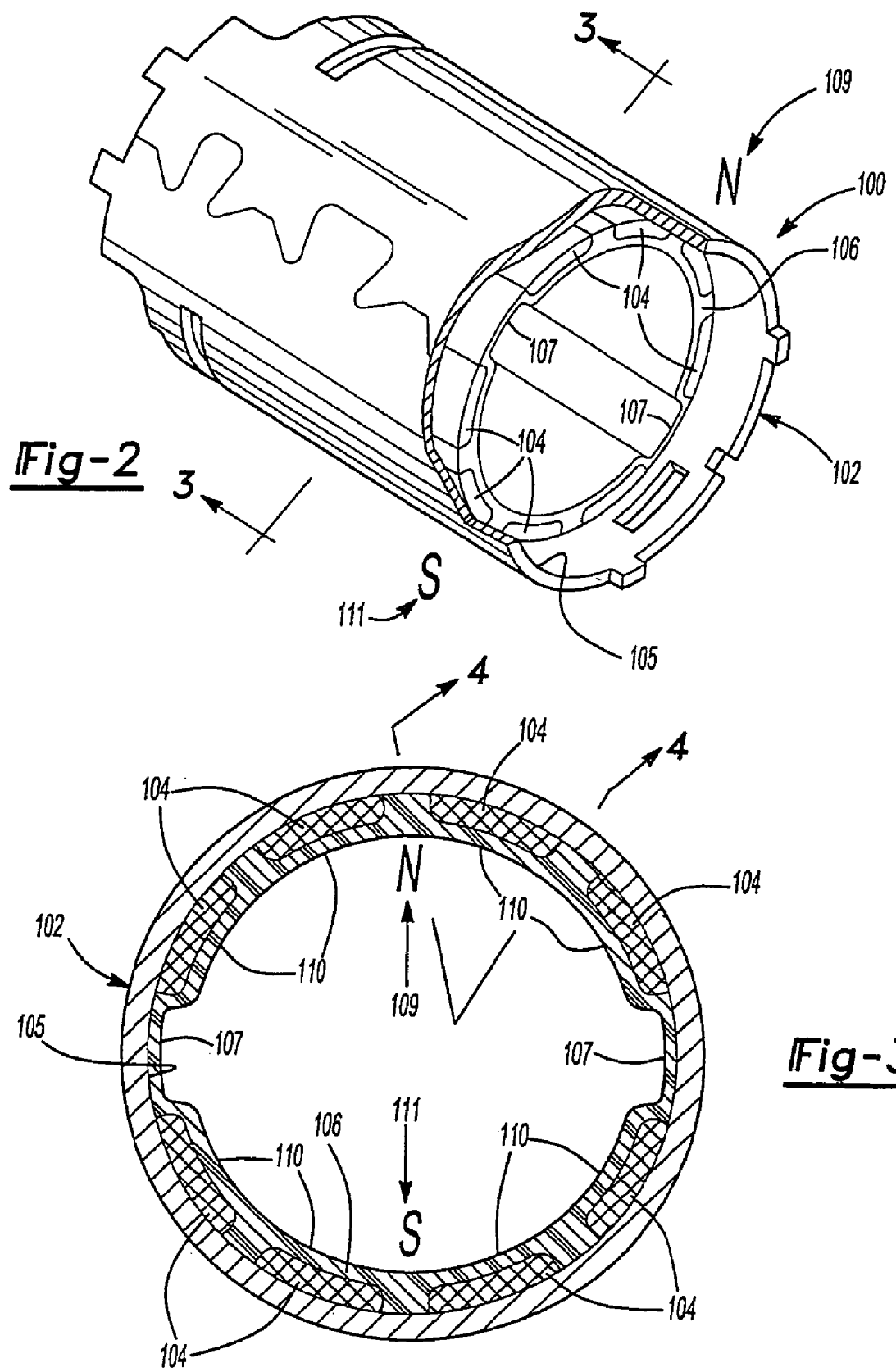

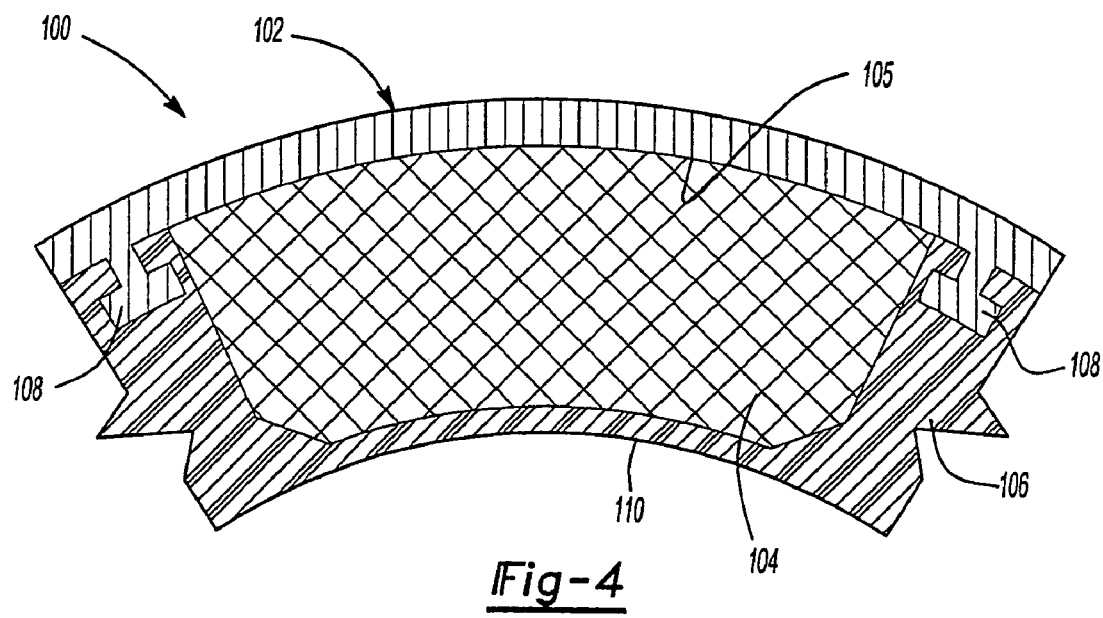
_Fig-4_
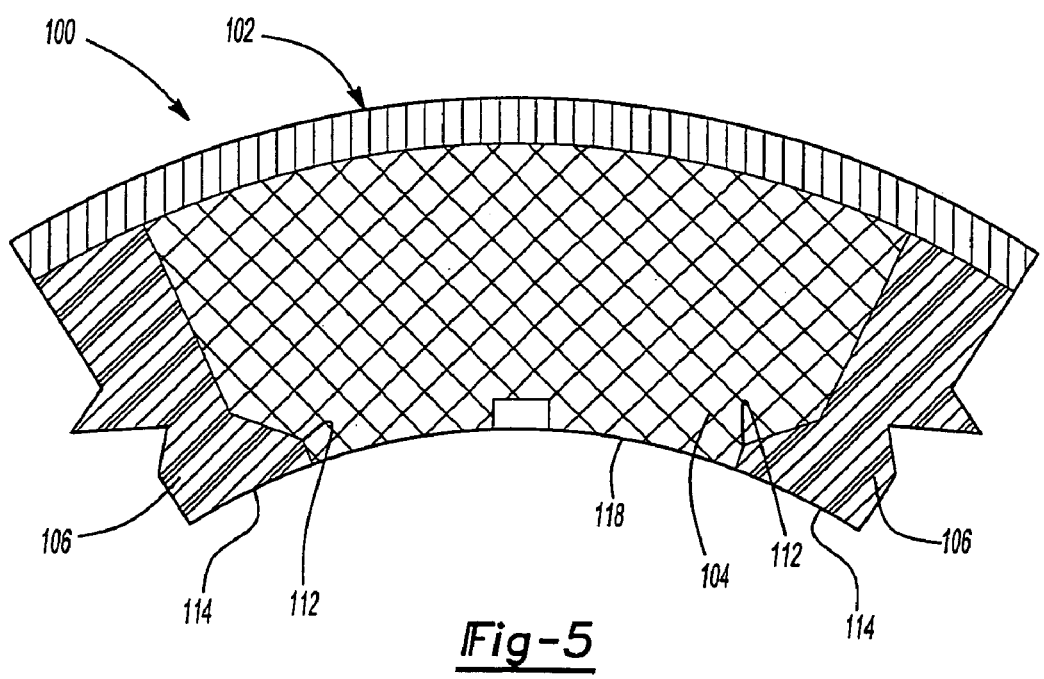
_Fig-5_

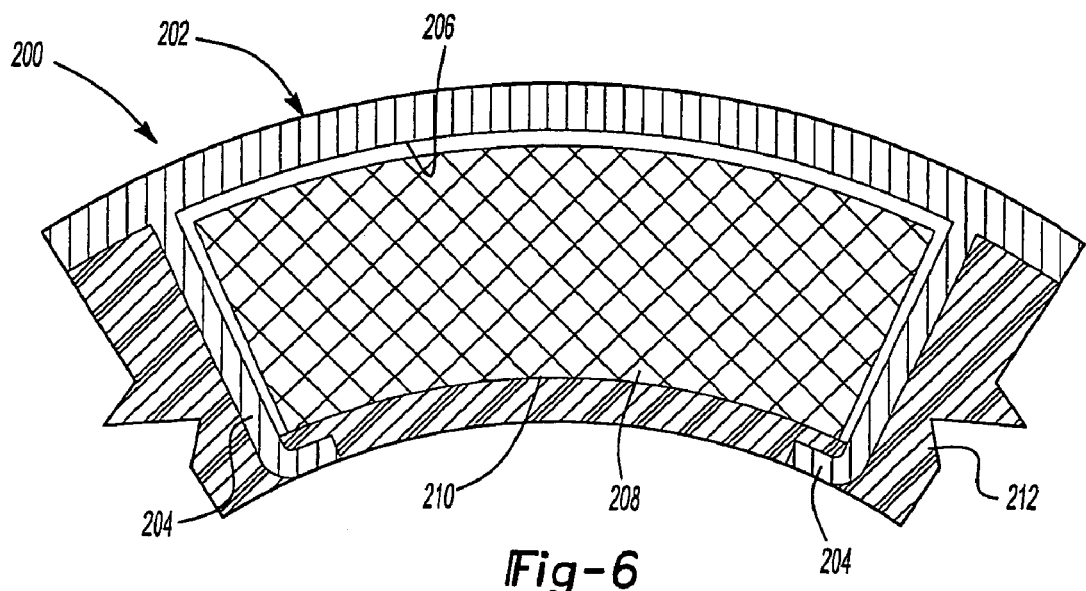
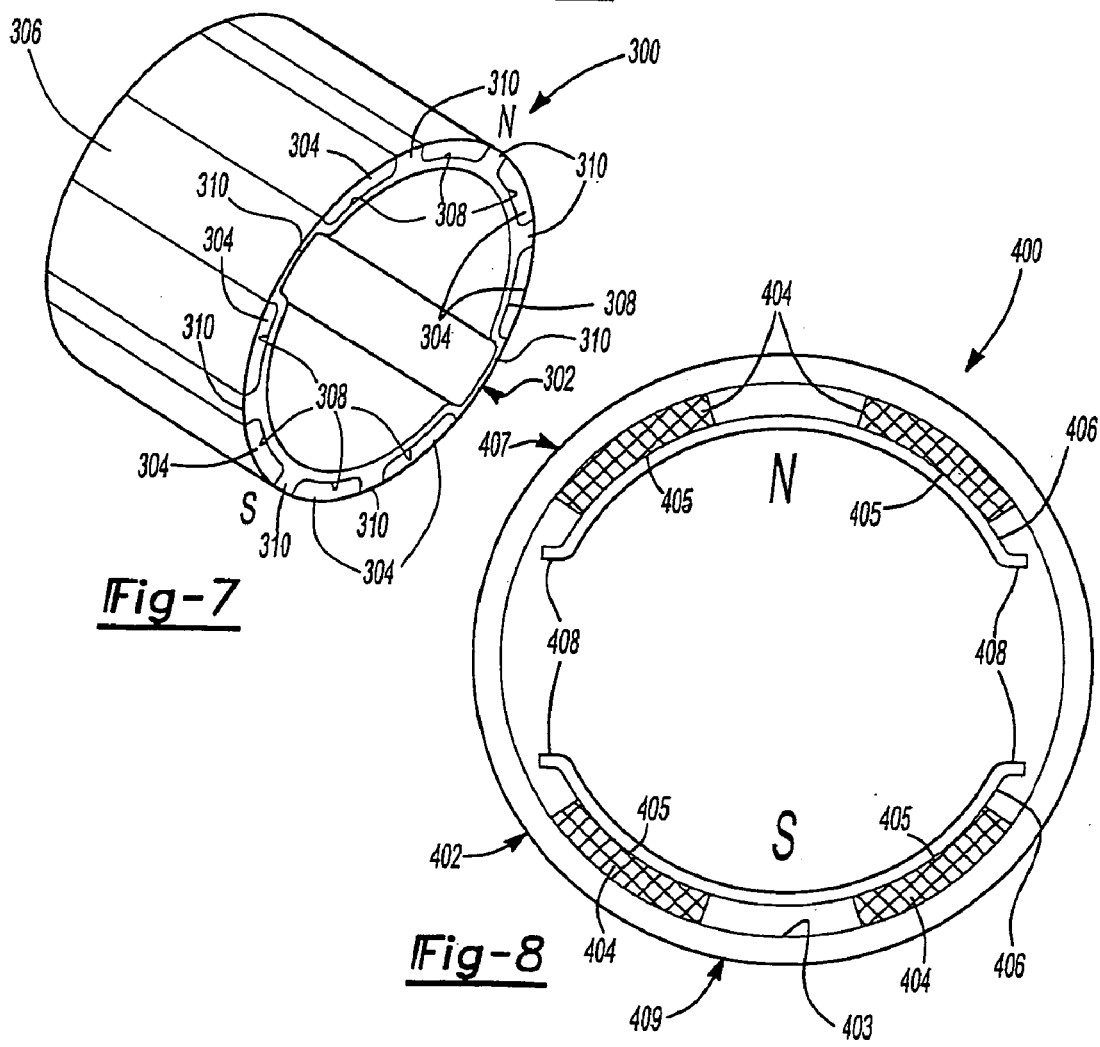

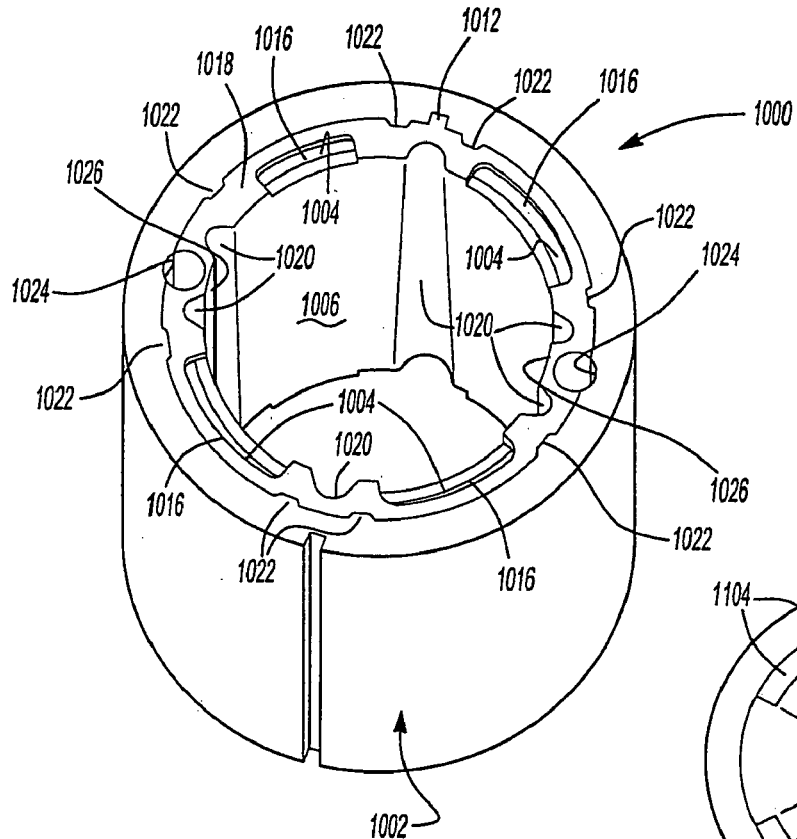
*Fig-38A*
*Fig-39*
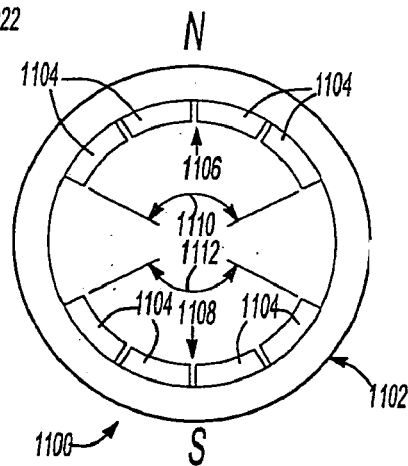
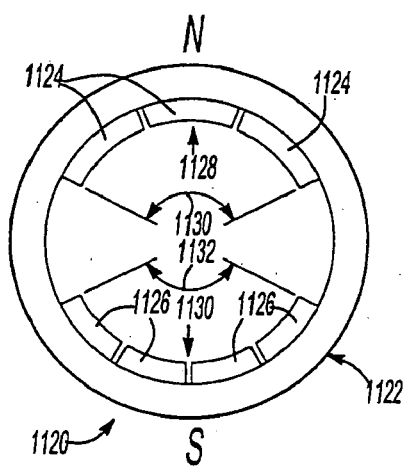
*Fig-40*
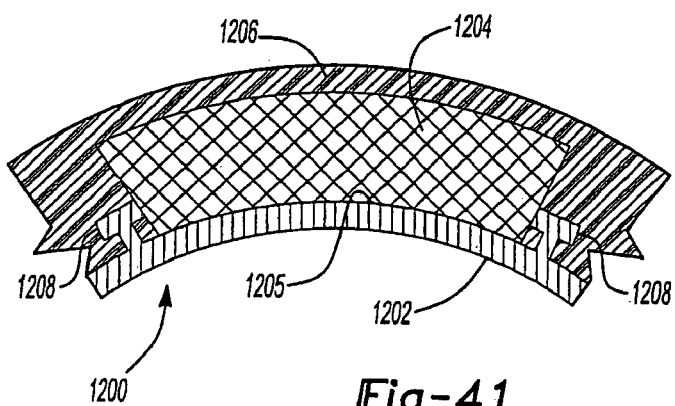
*Fig-41*

US 7,091,642 B2

FIELD ASSEMBLY FOR A MOTOR AND METHOD OF MAKING SAME

CROSS-REFERENCE TO RELATED APPLICATIONS

This application is a divisional of Ser. No. 10/468,643 filed Aug. 20, 2003, which is a National Stage of International Application No. PCT/US02/05029 filed Feb. 22, 2002, which claims the benefit of U.S. Provisional Application No. 60/271,141 filed on Feb. 23, 2001. The disclosures of the above applications are incorporated herein by reference.

FIELD OF THE INVENTION

The present invention relates to field assemblies for electric machines.

BACKGROUND OF THE INVENTION

In construction of field assemblies for electric machines, magnets must be retained on a cylinder of the field assembly. For example, in a brush type of motor, magnets must typically be retained on a stator housing or a separate flux ring within the stator housing. Ordinarily, these magnets have been glued or adhered to the metallic flux ring or stator housing. This typically involves gluing or adhering each individual magnet to the flux ring or stator housing.

In adhering the magnets to the metallic surface so that the magnets do not shift during use, various types of adhesives have been used. While some of the adhesives have been satisfactory, some adhesives work better than others. As the adhesives age, it is possible that if the device using the electric machine, such as a power tool having a motor, is dropped, that the sudden shock will destroy the bond between the magnet and the housing or flux ring, enabling the magnet to travel within the motor. The magnet itself could also break. When this occurs, the motor ceases to function.

More recently, due to the advent of molded magnets, it is possible to provide an anchor in the flux ring or stator housing and injection mold the magnetic material on the flux ring or stator housing and around the anchor, which then retains the molded magnet material on the flux ring or stator housing. Such an anchor system is disclosed in U.S. application Ser. No. 09/492,059 filed Jan. 27, 2000 entitled Anchoring System for Injection Molded Magnets on a Flux Ring or Motor Housing and in U.S. application Ser. No. 09/764,004 filed Jan. 17, 2001 entitled Anchoring System for Injection Molded Magnets on a Flux Ring or Motor Housing.

However, a disadvantage of the anchoring systems described in the above two referenced patent applications is that they require the use of injection molded magnetic material, which is typically the most expensive type of magnetic material per unit flux.

There are 3 different types of hard magnet materials that are commonly used in small DC motors for portable battery operated power tools: ferrite, bonded Neodymium Iron Boron, and sintered Neodymium Iron Boron. (Neodymium Iron Boron will be referred to herein as "Neo".) The latter two materials are considered high magnetic energy density hard magnetic materials. ("Hard magnetic material" is material that can be permanently magnetized. "Soft magnetic material," on the other hand, is material that carries magnetic flux but that cannot be permanently magnetized.) The bonded Neo magnet material can be injection molded or compression bonded. Compression bonded magnets, such as the magnets available from Magnequench, Inc., 6435 Scatterfield Road, Anderson, IN 46013-9606 under the MQ product designations, come in multiple varieties of increasing total magnetic flux: MQ1, MQ2, and MQ3, which is mainly a result of the amount of processing they receive and at what temperature and pressure they are pressed.

The cost effectiveness of magnets can be measured in magnetic flux (in Gauss) per unit cost (in $). In general, the flux per dollar of the previously mentioned magnet materials is as follows from most expensive to least expensive: injection molded bonded Neo, MQ1 Neo, MQ2 Neo, MQ3 Neo, sintered Neo, and ferrite. The flux per dollar of MQ3 Neo and sintered Neo is very close to that of ferrite.

SUMMARY OF THE INVENTION

In accordance with the invention, a cylinder/magnet assembly for a field assembly of an electric machine is formed by placing magnets between anchors on a surface of a cylinder made of soft magnetic material, and molding plastic around the magnets and anchors to secure the magnets to the cylinder. In an aspect of the invention, plastic is molded around the magnets and anchors by placing the cylinder with magnets therein into an injection molding die and injection molding plastic around the magnets and anchors. The magnets are made of hard magnetic material. The magnets are then fully magnetized after the molding process is complete. In an aspect of the invention, the electric machine is a brush type motor and the cylinder is a flux ring or stator housing. In another aspect of the invention, the electric machine is a brushless motor and the cylinder is a ring of a rotor. In another aspect of the invention, the electric machine is an alternator or generator and the cylinder is a ring of a rotor.

In accordance with another aspect of the invention, a cylinder/magnet assembly is assembled by forming an annular magnet assembly by injection molding plastic around pre-formed magnets and then assembling the annular magnet assembly into a flux ring or stator housing.

In accordance with another aspect of the invention, the anchors extend radially inwardly and have a height greater than a height of the magnets so that a straight line distance between inward ends of adjacent anchors having a magnet therebetween is less than a straight line distance between opposed side edges of an inner surface of the magnet. The adjacent anchors thus prevent the magnet between them from moving radially inwardly during the molding of the plastic.

In accordance with another aspect of the invention, flux spreaders are affixed to inner surfaces of the magnets, preferably high magnetic energy density magnets such as MQ magnets, to spread out the flux. The flux spreaders are secured by the molding of the plastic around them when the plastic is molded around the magnets and anchors.

In accordance with another aspect of the invention, each anchor adjacent a magnet has first and second base portions adjacent opposite ends of the magnet to which the anchor is adjacent. The anchor also has a generally rectangular segment, spaced away from the inner surface of the cylinder, extending between the first and second base portions. The anchor is appropriately dimensioned as a flux spreader. In an aspect of the invention, each anchor has at least one lengthwise split to facilitate rolling the stamped blank from which the cylinder is rolled. In an aspect of the invention, holes are provided where the base portions of the anchors meet the inner surface of the cylinder which act as magnetic chokes and also facilitate rolling the cylinder from the stamped blank.

In accordance with another aspect of the invention, the magnets have stepped edges and each anchor adjacent a side of a magnet includes an inwardly extending finger having a distal end that is received in the stepped edge of the adjacent magnet. The plastic is molded so that there is no layer of plastic molded on the inner surfaces of the magnets to reduce the air gap between the inner surfaces of the magnets and the rotor of the motor armature.

In accordance with another aspect of the invention, the plastic is molded by gating it between inner and outer radii of the magnets over flats in opposed circumferential ends of the magnets.

In accordance with another aspect of the invention, a cylinder/magnet assembly for a stator of a motor is formed by inserting magnets having stepped edges in a cylinder, such as a flux ring or stator housing, placing the cylinder/magnet assembly into an injection molding die and injection molding plastic around the magnets and their stepped edges to secure the magnets in place in the cylinder. In an aspect of the invention, plastic is molded so that it is not disposed on inner surfaces of the magnet to reduce an air gap between the inner surfaces of the magnets and the armature rotor.

In accordance with another aspect of the invention, a cylinder/magnet assembly for a stator of a motor is formed by inserting magnets into an assembly ring having outwardly opening magnet receiving pockets. The assembly ring with magnets is inserted into a cylinder and plastic molded around the assembly ring and magnets to secure the assembly ring and magnets to the cylinder. The assembly ring holds the magnets in place during the molding of the plastic.

In accordance with another aspect of the invention, a cylinder/magnet assembly for a stator of a motor is formed by inserting magnets in a first assembly ring. The first assembly ring with magnets is placed in one end of a cylinder. A second assembly ring is placed in the other end of the cylinder and mated to the first assembly ring. Plastic is molded around the assembly rings and magnets to secure the assembly rings and magnets to the cylinder. The assembly rings hold the magnets in place in the cylinder during the molding of the plastic.

In accordance with another aspect of the invention, a cylinder/magnet assembly for a stator of a motor is formed by inserting magnets into magnet pockets in an inner surface of a cylinder. Plastic is molded around the magnets to secure the magnets to the cylinder.

In accordance with another aspect of the invention, pilot features that mate with pilot features in one or both end caps of the motor are molded in one or both end walls of the plastic molding formed during molding of the plastic.

In accordance with another aspect of the invention, a cylinder and magnet assembly for a stator of a motor has a cylinder. The assembly has at least one pair of north and south poles. Each north and south pole has a distribution angle. At least one magnet is secured on an inner surface of the cylinder throughout the distribution angle for the north pole and at least one magnet is secured on an inner surface of the cylinder throughout the distribution angle for the south pole. The distribution angles for the north and south poles are unequal.

In accordance with another aspect of the invention, a cylinder and magnet assembly has at least one pair of north and south poles. Each north and south pole has a plurality of magnets secured to an inner surface of a cylinder. The number of magnets for each north pole is different than the number of magnets for each south pole.

In accordance with another aspect of the invention, a motor has a stator made in accordance with one or more of the above aspects of the invention.

In accordance with another aspect of the invention, a power tool includes a housing with a motor made in accordance with one or more of the above aspects of the invention.

In accordance with a another aspect of the invention, several small magnets, preferably high magnetic energy density magnets such as MQ type magnets, are used for more efficient flux distribution.

In accordance with a another aspect of the invention, soft iron flux spreaders are affixed to inner surfaces of the magnets, preferably high magnetic energy density magnets such as MQ magnets, to spread out the flux density and captured by opposed securing rings placed in opposite sides of the cylinder.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 2 illustrates a perspective view of a cylinder/magnet assembly for a stator for a direct current motor in accordance with the invention;

FIG. 3 is a cross-section view of the cylinder/magnet assembly of FIG. 2 taken along the line 3—3 of FIG. 2;

FIG. 4 is an arcuate section view of the cross-section view of FIG. 3 taken along the line 4—4 of FIG. 3;

FIG. 5 is an arcuate section view of a variation of the cylinder/magnet assembly of FIG. 2;

FIG. 6 is an arcuate section view of a flux ring/magnet assembly for a stator assembly for a direct current motor in accordance with the invention;

FIG. 7 is a perspective view of a plastic ring/magnet assembly for a stator assembly for a direct current motor in accordance with the invention;

FIG. 8 is a cross-section view of a cylinder/magnet assembly for a stator of a motor in accordance with an aspect of the invention;

FIG. 38A is a perspective view of the cylinder with magnet pockets of FIG. 38;

FIG. 39 is a cross-section view of a cylinder and magnet assembly for a stator of a direct current motor with the north and south poles of the assembly having unequal distribution angles;

FIG. 40 is a cross-section view of a cylinder and magnet assembly for a stator of a direct current motor with the north and south poles of the assembly having unequal numbers of magnets; and FIG. 41 is an arcuate cross-section of a field for a rotor of a brushless motor or alternator in accordance with the invention.

DETAILED DESCRIPTION OF THE PREFERRED EMBODIMENTS

The following description of the preferred embodiment(s) is merely exemplary in nature and is in no way intended to limit the invention, its application, or uses.

Figure 1:
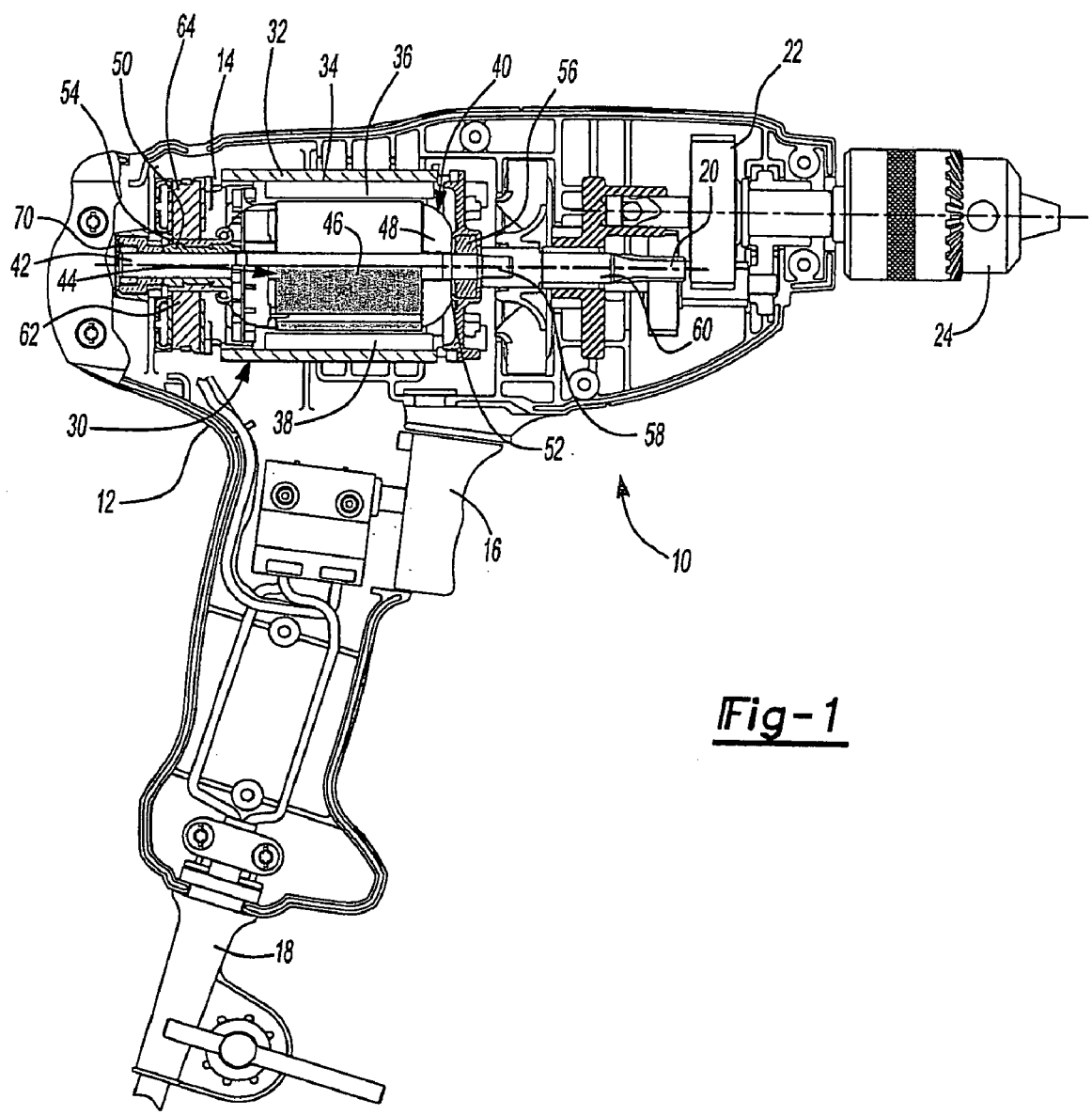
FIG. 1 illustrates a cross-section view of a power tool in accordance with the present invention.

Turning to FIG. 1, a power tool in accordance with the present invention is illustrated and designated with the reference numeral 10. The power tool 10 is illustrated as a drill; however, any type of power tool may be used with the motor of the present invention. The power tool 10 includes a housing 12 which surrounds a motor 14. An activation member 16 is coupled with the motor 14 as well as with a power source 18. The power source 18 may be a power cord (AC current) or the power tool may have a battery (DC current) (not shown). The motor 14 is coupled with an output 20 which may include a transmission 22 and a chuck 24 to retain a tool (not shown) with the drill.

The motor 14 includes a stator assembly 30 which includes a housing 32, flux ring 34, and magnets 36 and 38. An armature 40 includes a shaft 42, a rotor 44 with laminations 46 and windings 48, as well as a commutator 50 coupled with the shaft 42. The motor also includes end plates 52 and 54. End plate 52 includes a bearing 56 which supports one end of the shaft 58 which is coupled with a pinion 60 which is part of the power tool output. Brushes 62 and 64 are associated with the commutator 50. A bearing 70 is also coupled with the end cap to balance rotation of the shaft 42.

An electric machine is an electric motor, alternator or generator. A field assembly for an electric machine is the part of the electric machine that provides magnetic flux. In a brush type electric machine, the field is usually the stator. In a brushless electric machine, the field is usually the rotor.

Turning to FIGS. 2–4, a cylinder/magnet assembly for a field assembly of an electric machine, illustratively a stator assembly 100, made in accordance with this invention is described. Stator assembly 100 would be used in motor 14 in lieu of stator assembly 30 of FIG. 1. Stator assembly 100 includes a cylinder, such as stator housing 102, made of soft magnetic material such as cold rolled steel. Stator housing 102 has anchors 108 formed therein, which illustratively extend inwardly. Magnets 104 are disposed around an inner surface 105 of stator housing 102 and a plastic molding 106, illustratively a ring, secures magnets 104 to stator housing 102. Stator assembly 100 is formed by placing stator housing 102 with magnets 104 disposed around its inner surface 105 in a die in an injection molding machine (not shown) and injection molding plastic therein to form plastic molding 106 around magnets 104 and anchors 108. In this regard, plastic may or may not be molded into recessed areas 107 between north pole 109 and south pole 111. Magnets 104 are sandwiched between portions 110 of plastic molding 106 and inner surface 105 of stator housing 102. In this regard, the portions 110 of plastic molding 106 must be sufficiently thick to withstand the stresses imposed on them when the DC motor, such as motor 14, is operating and such that might occur when power tool 10 is dropped. The plastic used to injection mold plastic molding 106 is preferably a high temperature plastic, such as high temperature nylon or PPS. This plastic can illustratively be nylon 66, which is not ferromagnetic.

Anchors 108 also serve to locate magnets 104 in place in stator housing 102 for subsequent molding. Magnets 104 are illustratively not magnetized when placed on inner surface 105 of stator housing 102, or lightly magnetized so that they hold themselves in place on inner surface 105 of stator housing 102. Magnets 104 are then fully magnetized in an operation subsequent to the completion of the molding process. However, it should be understood that magnets 104 can be magnetized prior to placement on inner surface 105 of stator housing 105.

With reference to FIG. 5, a variation of the aspect of the invention shown in FIGS. 2–4 is shown. Like elements are identified with like reference numerals. Magnets 104 have stepped edges 112. When the plastic is injection molded around magnets 104 and stepped edges 112 of magnets 104 to form plastic molding 106, the plastic forms finger like structures 114 on each side of the magnets 104 that cooperates with stepped edges 112 of magnets 104 to retain magnets 104 in place against the inner surface 105 of stator housing 102. In this regard, there is no need to sandwich the magnets 104 between plastic molding 106 and the inner surface 105 of stator housing 102, and thus no need for any plastic 116 to be disposed on inner surfaces 118 of magnets 104. This results in a smaller air gap being needed between inner surfaces 118 of magnets 104 and rotor 44 (FIG. 1) than is the case in the aspect of the invention shown in FIGS. 2–4. In this regard, the aspect of the invention shown in FIGS. 2–4 requires that the magnets 104 used therein have greater magnetic flux than the magnets 104 used in the aspect shown in FIG. 5 due to the larger air gap needed for the aspect shown in FIGS. 2–4 compared to the aspect shown in FIG. 5.

Turning to FIG. 6, an arcuate cross-section of a cylinder/magnet assembly, illustratively a flux ring/magnet assembly 200, made in accordance with an aspect of this invention is shown. Flux ring/magnet assembly 200 has an annular flux ring 202 having pairs of opposed magnet retaining fingers 204 extending from an inner surface 206. Flux ring 202 is illustratively an expandable flux ring made of soft magnetic material, such as cold rolled steel. A plurality of magnets 208 are disposed around the inner surface 206 of flux ring 202, with one such magnet 208 being shown in FIG. 6 held between opposed magnet retaining fingers 204. Flux ring 202 with magnets 208 held within the opposed pairs of magnet retaining fingers 204 is inserted in a die of an injection molding machine and plastic injection molded around magnets 208 and fingers 204 to form plastic molding 212. Plastic molding 212 cooperating with fingers 204 and the sides of magnets 208 secures magnets 208 in place against inner surface 206 of flux ring 202. While FIG. 6 shows plastic disposed on inner surfaces 210 of magnets 208, there is no need to sandwich the magnets 208 between plastic molding 212 and the inner surface 206 of flux ring 202. Thus, there no need for a layer of plastic to be disposed on inner surfaces 210 of magnets 208. Thus, a smaller air gap can be used between inner surfaces 210 of magnets 208 and rotor 44 (FIG. 1) than is the case in the aspect of the invention shown in FIGS. 2–4. Again, magnets 208 are illustratively not magnetized when placed on inner surface 206 of flux ring 202, or lightly magnetized.

Figure 9:
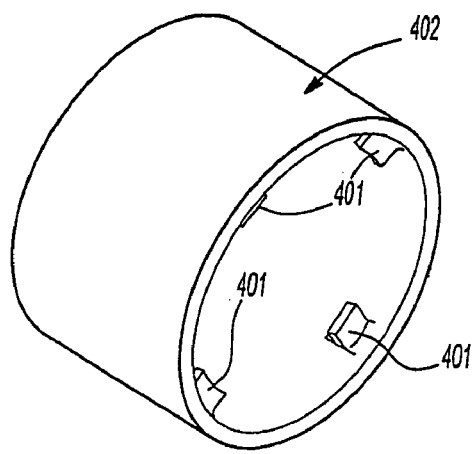
FIG. 9 is a perspective view of a cylinder of the cylinder/magnet assembly of FIG. 8.
Figure 10:
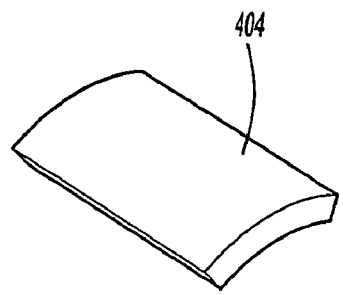
FIG. 10 is a perspective view of a magnet of the cylinder/magnet assembly of FIG. 8.
Figure 11:
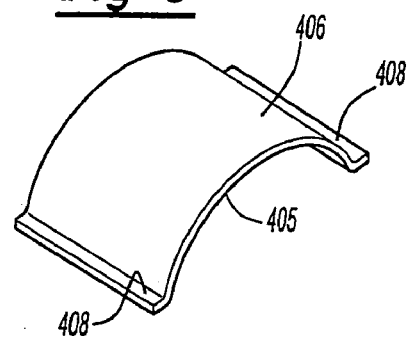
FIG. 11 is a perspective view of a flux spreader or pole piece of the cylinder/magnet assembly of FIG. 8.

Turning to FIG. 7, a plastic ring/magnet assembly 300 made in accordance with another aspect of the invention is shown. Plastic ring/magnet assembly 300 has an annular plastic ring 302 with magnets 304 disposed around an outer surface 306. In this regard, plastic ring 302 has magnet-receiving portions 308, such as slots defined between raised sections 310 on outer surface 306, in which magnets 304 are received. In one aspect of FIG. 7, annular plastic ring 302 is preformed, illustratively by injection molding, and magnets 304 are then inserted in magnet receiving portions 308. In this regard, magnets 304 and raised sections 310 can be provided with complementary beveled edges to retain magnets 304 in place. Plastic ring/magnet assembly 300 is then assembled into a stator housing, such as stator housing 102 (FIG. 2). In a second aspect of the invention of FIG. 7, plastic ring 302 is not preformed and the magnets 304 then inserted. Rather, plastic ring/magnet assembly 300 is formed by injection molding plastic around magnets 304. Plastic ring/magnet assembly 300 is secured in the stator housing, such as stator housing 102, such as by adhesive or mechanical fixation, such as might be provided by providing inwardly extending projections in stator housing 102, such as a spring projection similar to spring projection 401 discussed with reference to FIG. 9. Again, magnets 304 are fully magnetized subsequent to the molding process, although there would be no need to lightly magnetize them.

The magnets (magnets 104, 208 and 304) are pre-formed magnets, preferably of high energy density hard magnetic material such as MQ2, MQ3 or sintered Neo. An advantage that the various aspects of this invention provide is that these magnets do not require further processing after they are formed to optimize their tolerances. Generally, MQ3 or sintered Neo magnets must be machined to final size after they are formed since the sintering process used to form them does not result in precise shapes. When adhering magnets to the inner surface of a flux ring or stator housing using adhesive, the outer surface of the magnets needs to precisely conform to the inner surface of the flux ring or stator housing to obtain the optimum adhesive bond. The various aspects of this invention obviate the need to have precisely shaped magnets in that the magnets are held in place by plastic molding. In the aspects of the invention where the plastic is injection molded around the magnets, any variations in the shape of the magnets is accommodated by the plastic injection molding process by the plastic flowing around the magnets.

The aspects of the invention also provide for more efficient distribution of magnetic flux in that they allow for the use of more, smaller magnets and wide flexibility of the placement of the magnets in the stator housing or flux ring. In the aspects of the invention heretofore shown, such as shown in FIGS. 2–4, eight magnets 104 are illustratively used and are illustratively high magnetic energy density magnets, such as MQ2, MQ3, or sintered NEO magnets. In this regard, the eight magnets 104 are smaller than the two or four magnets that would typically have been used in stator assemblies. By using more, smaller magnets when high magnetic energy density magnets are used, the magnetic flux can be distributed more efficiently. Further, equivalent flux can be achieved at a lower cost using two spaced apart magnets per pole than one magnet that extends the length of the pole. In this regard, it should be understood that other than eight magnets can be used, such as two magnets per pole.

Turning to FIGS. 8–11, cylinder/magnet assembly, illustratively a stator assembly or permanent magnet motor field assembly 400, constructed with high magnetic energy density magnets, such as MQ type magnets, is shown. Permanent magnet motor field assembly 400 includes a cylinder, such as annular magnet return ring 402, with high magnetic energy density magnets 404 disposed around an inner surface 403 of magnet return ring 402. Magnet return ring 402 can be a flux ring or a stator housing and is made of soft magnetic material, such as cold rolled steel. In an embodiment, four magnets 404 are used which are illustratively MQ magnets, preferably MQ3 magnets, with two magnets 404 disposed on the inner surface 403 of a top (in the orientation of FIG. 8) cylindrical half 407 of magnet return ring 402 and two magnets 404 disposed on the inner surface 403 of a lower cylindrical half 409 of magnet return ring 402.

An arcuate shaped flux spreader or pole piece 406 is secured against inner surfaces 405 of the two magnets 404 in the top half 407 of magnet return ring 402 and another metal flux spreader or pole piece 406 is secured against inner surfaces 405 of the two magnets 404 in the lower half 409 of magnet return ring 402. In an embodiment, magnets 404 and pole pieces 406 are secured within magnet return ring 402 by two opposed securing rings 500 (FIGS. 12 and 13), as described in more detail below. In another embodiment, magnets 404 and pole pieces 406 are secured on magnet return ring 402 by injection molding plastic around magnets 404 and pole pieces 406 to secure magnets 404 and pole pieces 406 in place on magnet return ring 402.

Pole pieces 406 are shaped to cover the two magnets 404 that they are affixed against and have flanges 408 that extend outwardly from their sides. Pole pieces 406 are made of soft magnetic material, such as cold rolled steel or soft iron, and distribute and spread the magnetic flux provided by the magnets 404 that pole pieces 406 are affixed against.

Figure 12:
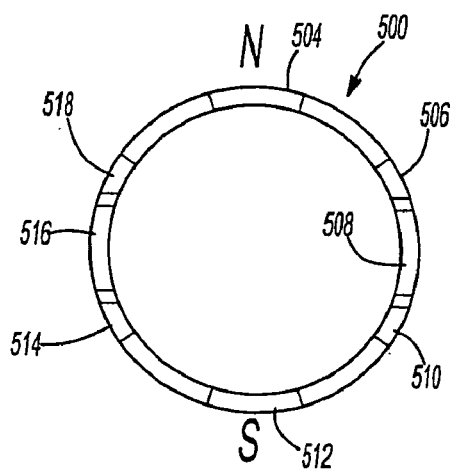
FIG. 12 is a cross-section of a securing ring for the cylinder/magnet assembly of FIG. 8.
Figure 13:
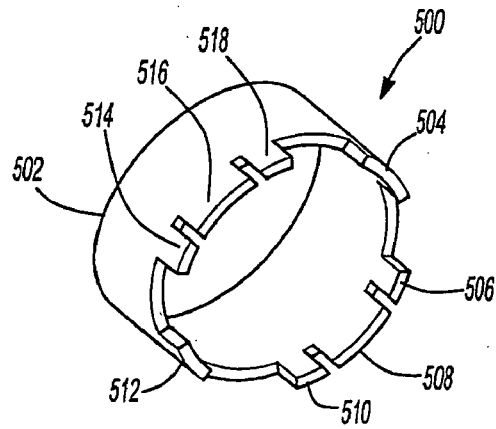
FIG. 13 is a perspective view of the securing ring of FIG. 12.
Figure 13A:
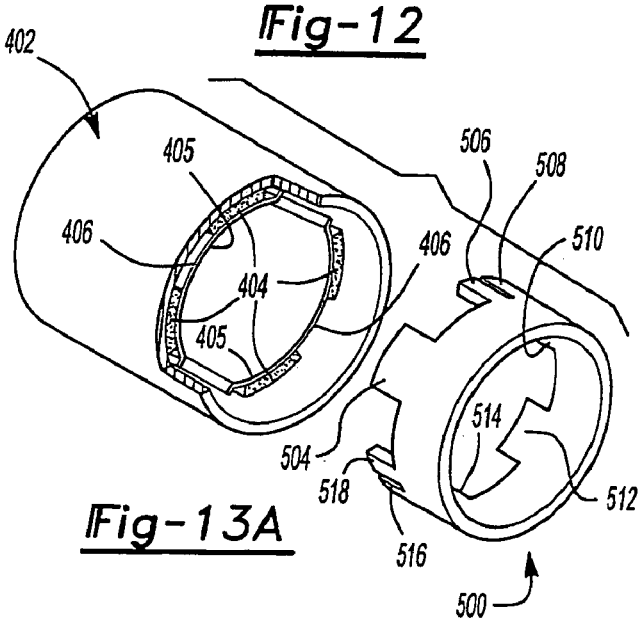
FIG. 13A is an exploded assembly view of the cylinder/magnet assembly of FIG. 8 with the securing rings of FIGS. 12 and 13.

Referring to FIGS. 12 and 13, securing ring 500 has an annular base 502 with fingers 504, 506, 508, 510, 512, 514, 516 and 518 extending therefrom. Two securing rings 500 are inserted into magnet return ring 402 from opposite ends of magnet return ring 402 so that sides of magnets 404 and flanges 408 of pole pieces 406 are captured between adjacent fingers of the two securing rings 500. The securing rings 500 are secured within magnet return ring 402 such as by adhesive or mechanical fixation, such as might be provided by providing magnet return ring 402 with inwardly extending projections, such as spring projection 401 (FIG. 9), that capture securing rings 500. Securing rings 500 are illustratively molded plastic rings.

In this regard, going clockwise around magnet securing ring 402 and securing ring 500 from the twelve o'clock position or north position (as oriented in FIGS. 8 and 12) the northeast located magnet 404 is captured between fingers 504 and 506 of securing rings 500. The generally east directed flange 408 of the pole piece 406 in the top half 407 of magnet return ring 402 is captured between fingers 506, 508 of securing rings 500. The generally east directed flange 408 of the pole piece 406 in the lower half 409 of magnet return ring 402 is captured between fingers 508, 510 of securing rings 500. The southeast located magnet 404 is captured between fingers 510 and 512 and the next southwest located magnet 404 is captured between fingers 512 and 514 of securing rings 500. The generally west directed 408 flange of pole piece 406 in the lower half 409 of magnet return ring 402 is captured between fingers 514 and 516 of securing rings 500. The generally west directed flange 408 on pole piece 406 in the top half 407 of magnet return ring 402 is captured between fingers 516 and 518 and the northwest located magnet 404 is captured between fingers 518 and 504 of securing rings 500.

Turning to FIGS. 14–18, a variation of the embodiments of FIGS. 4 and 6 is shown. A cylinder/magnet assembly, illustratively a flux ring/magnet assembly 600 (FIG. 8) has an expandable flux ring 602. Flux ring 602 is made of soft magnetic material, such as cold rolled steel, CRS1006 or CRS1008 for example. Flux ring 602 is illustratively formed by stamping a rectangular sheet metal blank and rolling the stamped sheet metal blank. The rectangular sheet metal blank is stamped to form fingers 604 at both ends and a plurality of pairs of spaced apart, inwardly projecting anchors 606 transversely extending across flux ring 602. Anchors 606 are illustratively arcuate wire shaped segments, as shown in more detail in FIG. 18, with spaces 607 thereunderneath through which plastic can flow during molding.

Figure 15:
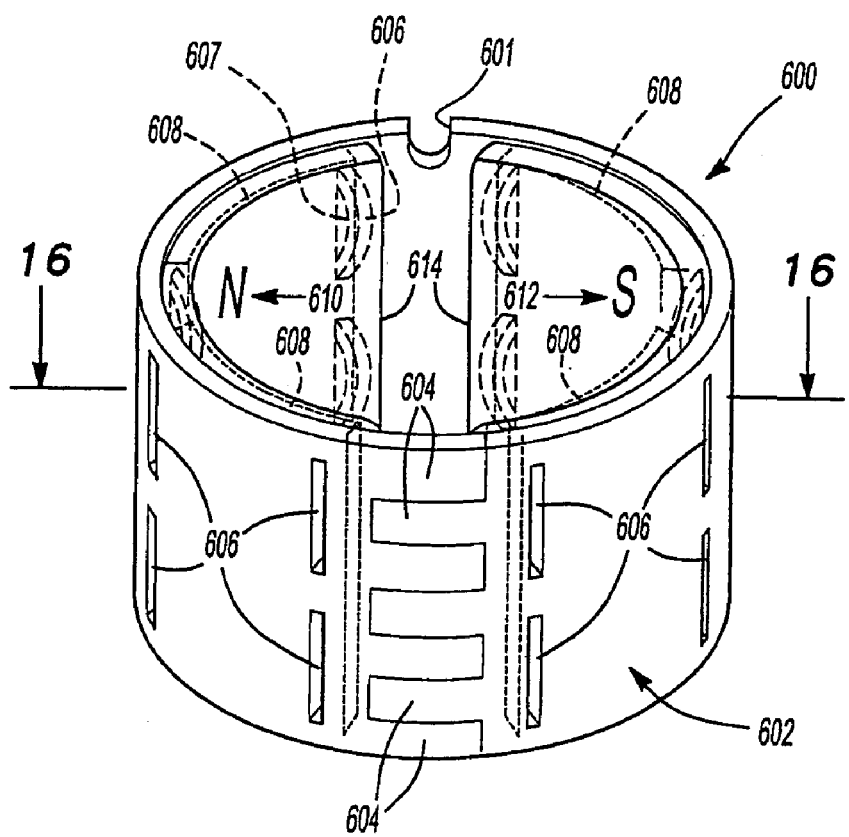
FIG. 15 is a perspective view of a flux ring and magnet assembly for a stator of a direct current motor in accordance with the invention using the flux ring of FIG. 14.
Figures 16, 17, 18:
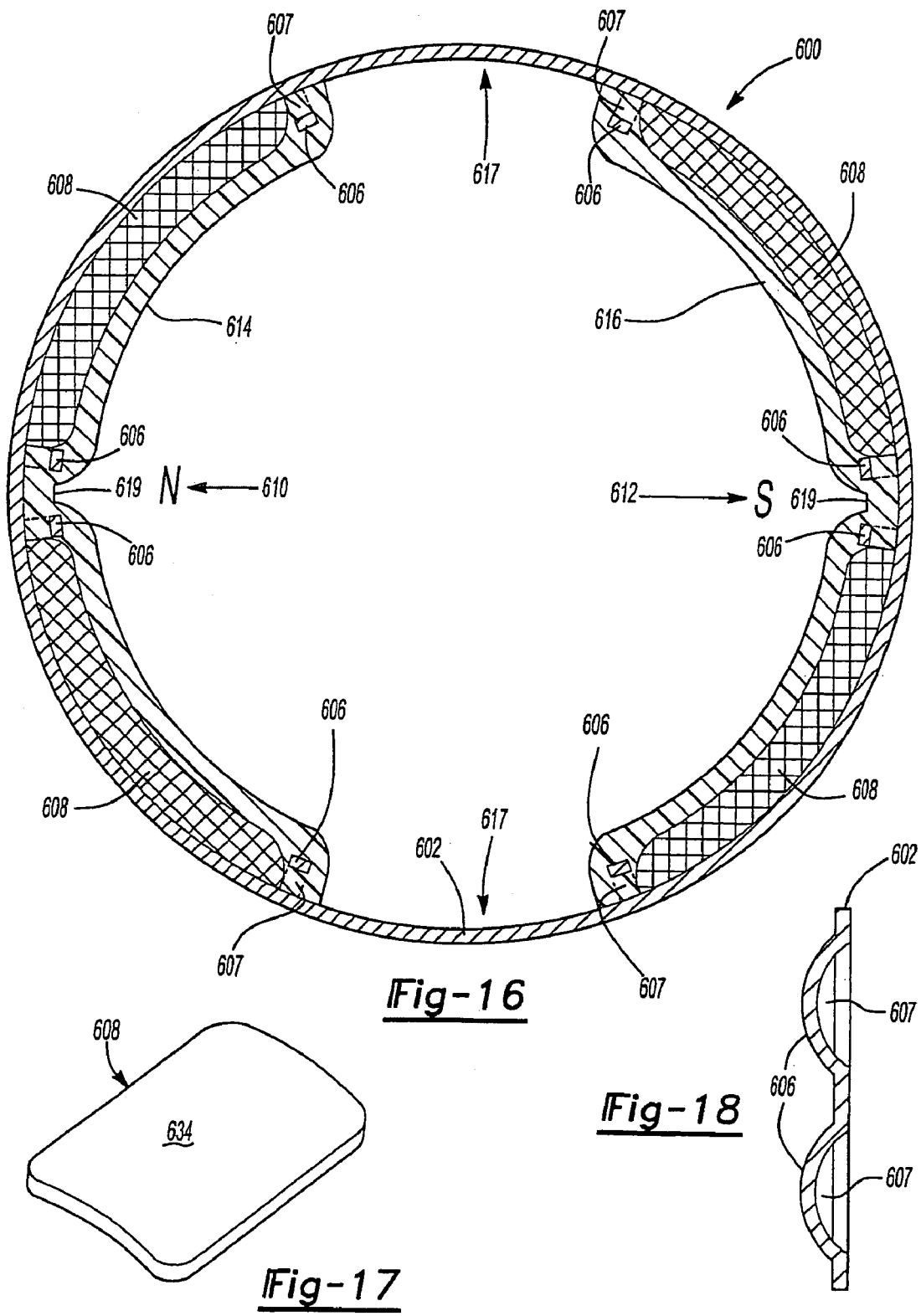
FIG. 16 is a cross-section of the flux ring and magnet assembly taken along the line 16—16 of FIG. 15.
FIG. 17 is a perspective view of a magnet used in the flux ring and magnet assembly of FIG. 15.
FIG. 18 is an enlarged section view of the flux ring taken along the line 18—18 of FIG. 14 through an anchor of the flux ring.

Flux ring/magnet assembly 600 further includes a magnet 608 disposed between each pair of spaced apart anchors 606 (see FIG. 15). Illustratively, flux ring/magnet assembly 600 has four magnets 608, with two adjacent magnets 608 for a north pole 610 and the other two adjacent magnets 608 for a south pole 612. Magnets 608 are illustratively made of 34KC2 sintered Neo magnetic material available from Magnequench.

Flux ring/magnet assembly 600 is made in accordance with the above discussed process. A magnet 608 is inserted between each pair of opposed anchors 606 of expandable flux ring 602 which locate magnets 608 in place in expandable flux ring 602 for the subsequent molding. As discussed above, magnets 608 are illustratively not magnetized, or lightly magnetized so that they hold themselves in place on an inner surface 603 of flux ring 602.

Each magnet 608 is illustratively rectangular in shape, curved along its width, so that an outer surface 634 of each magnet 608 conforms to inner surface 603 of flux ring 602. Magnets 608 are thus illustratively shaped as arcuate sections of a cylinder.

Flux ring 602 with magnets 608 therein is then inserted into a mold in an injection molding machine and precisely located in the mold by notch 601 in an end of flux ring 602. Plastic is then injection molded around the magnets 608 and anchors 606, including through spaces 607 under anchors 606. This illustratively results in an arcuate plastic segment 614 encapsulating the adjacent magnets 608 of the north pole 610 and the anchors 606 adjacent those magnets and extending through spaces 607 beneath the anchors 606 adjacent those magnets, and an arcuate plastic segment 616 encapsulating the adjacent magnets 608 of the south pole 612 the anchors 606 adjacent those magnets and extending through spaces 607 beneath the anchors 606 adjacent those magnets so that the plastic is interlocked with the anchors when the plastic hardens. Gaps 617 between arcuate plastic segments 614, 616 provide for uniform wall thickness of the plastic and enhance air flow through flux ring/magnet assembly 600 when it is assembled in a motor. Also, fingers 604 of flux ring 602 are disposed in one of gaps 617, allowing flux ring 602 to expand and contract. Recesses 619 between adjacent magnets 608 of each pole also provide for uniform wall thickness of the plastic and enhance air flow through flux ring/magnet assembly 600. As is known, keeping the wall thickness of molded plastic uniform is desirable so that the plastic cools uniformly. Without gaps 617 and recesses 619, the thickness of the plastic over the areas of inner surface 603 of flux ring 602 on which magnets 608 are disposed would be greater than the thickness of the plastic over magnets 608.

Figures 19, 20, 21, 22, 23:
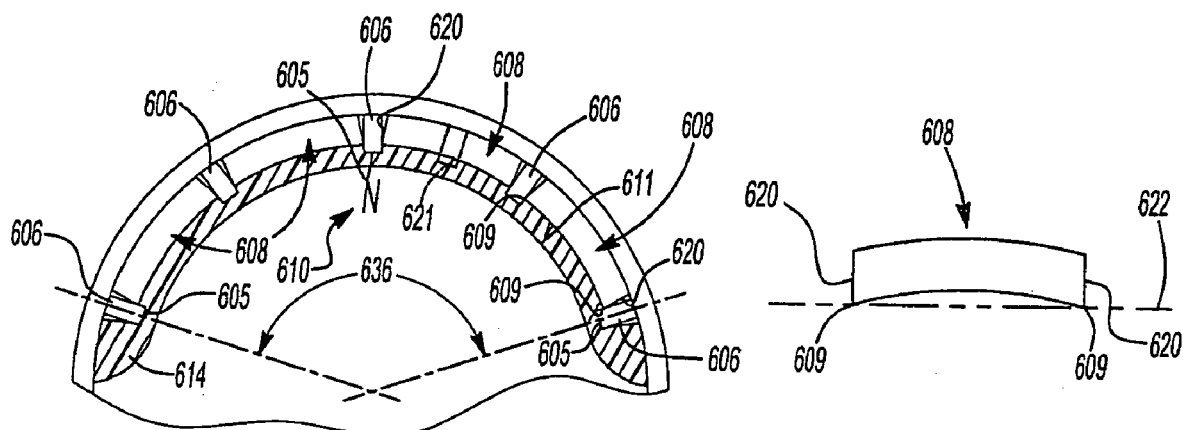
FIG. 19 is a cross-section view of a cylinder and magnet assembly for a stator for a direct current motor in accordance with the invention.
FIG. 20 is an end view of a magnet of the cylinder and magnet assembly of FIG. 19.
FIG. 21 is a perspective view of the magnet of FIG. 20.
FIG. 22 is a partially broken cross-section view of a section of a modification of the cylinder and magnet assembly of FIG. 19.
FIG. 23 is cross-section view of a cylinder and magnet assembly for a stator for a direct current motor in accordance with the invention.

With reference to FIGS. 19–21, anchors 606 can also advantageously be used to keep magnets 608 from moving radially inwardly. Sidewalls 620 of magnets 608 are vertical with respect to a horizontal plane 622 (as oriented in FIG. 20). Thus, when magnets 608 are positioned between anchors 606 in flux ring 602, sidewalls 620, while they extend inwardly, do not extend radially inwardly toward a center of flux ring 602. On the other hand, anchors 606 do extend radially inwardly toward the center of flux ring 602. Opposed side edges 609 of magnets 608 will thus intersect anchors 606 and prevent magnets from moving radially inwardly. In this regard, anchors 606 illustratively have a height that slightly exceeds the height of magnets 608. Thus, a straight line distance between inward ends 605 of each set of adjacent anchors 606 having a magnet 608 therebetween is less than a straight line distance between opposed side edges 609 of inner surface 611 of the magnet 608 between those anchors 606.

To retain magnets in the axial direction across flux ring 602, flux ring 602 can be formed with end tabs 621, only one of which is shown in FIG. 19. Illustratively, flux ring 602 would have one end tab 621 for each magnet 608. When a magnet 608 is placed in flux ring 602 between anchors 606, an end 623 of magnet 608 would be butted against the end tab 621 and plastic would illustratively be gated on the end 623 of magnet 608 opposite end tab 621. This facilitates making subassemblies of magnets 608 and flux rings 602 prior to the molding process.

Turning to FIGS. 22 and 23, a variation of the invention described with respect to FIGS. 19–21 is shown. As shown in FIG. 22, sidewalls 620' of magnets 608 are angled to more closely match, or parallel, the radial projection of anchors 606. In this regard, flats 624 at both ends of a radial inner surface 626 of each magnet 608 would be sized to provide optimum retention of magnets 608. Since angling the sidewalls 620' of magnets 608 would slightly reduce the volume of magnets 608 compared to magnets 608 having vertical or flat sidewalls 620, the distribution or included angle 636' of north pole 610' having magnets 608 with angled sidewalls 620' (FIG. 23) would be slightly larger than the distribution angle 636 (FIG. 19) of north pole 610 having magnets with flat or vertical sidewalls 620.

Angled sidewalls 620' make is possible to reduce the necessary clearances between magnets 608 and anchors 606 due to reduced tolerance stackups. This is due to the fact that the width of magnets 608 can be controlled to a tighter tolerance than flats 624. By angling the sidewalls of magnets 608, the tolerance stackup is between the sidewalls of magnets 608 and spacing of anchors 606, independent of flats 624 and height of anchors 606. This provides improved positional accuracy of magnets 608 in flux ring 602.

Figure 14:
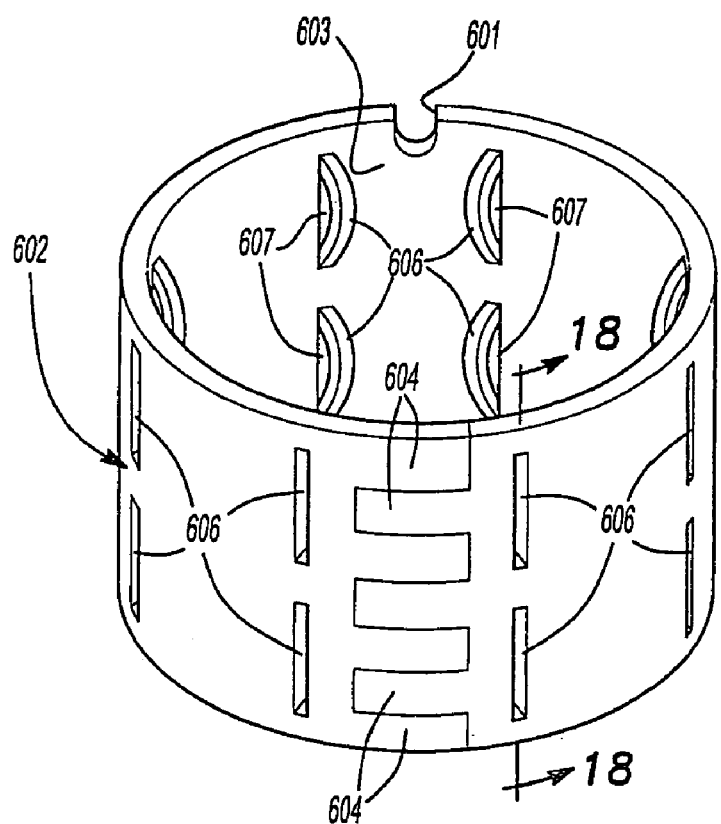
FIG. 14 is a perspective view of a flux ring of a flux ring and magnet assembly for a stator of a direct current motor in accordance with the invention.

To optimize motor performance, magnets 608 should ideally rest up against the inner surface of the flux ring, such as inner surface 603 of flux ring 602 (FIG. 14).

Figure 24:
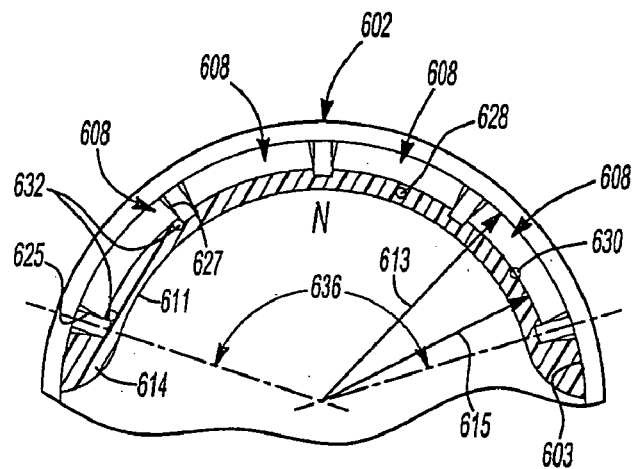
FIG. 24 is a cross-section view of a cylinder and magnet assembly for a stator for a direct current motor in accordance with the invention showing gate locations for plastic molding.

With reference to FIG. 24, there are a number of gating positions where the plastic can be gated in the injection mold against magnets 608. The plastic can be gated against the center of magnets 608, shown at 628 in FIG. 24. Another gate position would be between an inner radius 613 and an outer radius 615 of magnets 608, preferably, just inside inner radius 613 of magnets 608 as shown at 630 in FIG. 24.

Magnets 608 can be formed with flats 624 at opposed circumferential ends 625, 627 of radially inner surface 611 and the gate position located over flats 624 and between inner and outer radii 613, 615 of magnets 608 shown at 632 in FIG. 24. Flats 624 are appropriately sized so that the gate is effectively between inner and outer radii 613, 615 of magnets 608.

To optimize motor performance, magnets 608 should ideally rest up against the inner surface of the flux ring, such as inner surface 603 of flux ring 602 (FIG. 14). By lightly magnetizing the magnets 608 before molding the plastic, magnets 608 hold themselves against inner surface 603 of flux ring 602 during molding the plastic, which prevents, or at least minimizes, plastic from getting between the magnets 608 and inner surface 603 of flux ring 602.

Figure 25:
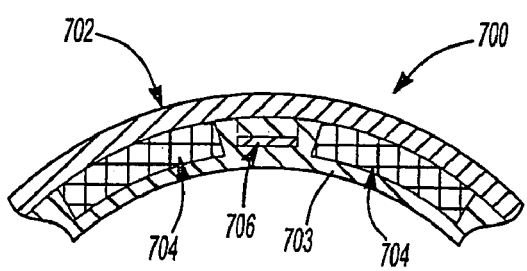
FIG. 25 is a cross-section view of a section of a flux ring and magnet assembly for a direct current motor in accordance with the invention.

FIG. 25 shows an alternative embodiment of a flux spreader. A cylinder/magnet assembly, illustratively a flux ring/magnet assembly 700, has a flux ring 702 and a plurality of magnets 704 affixed therein. It should be understood that flux ring 702 could alternatively be a stator housing. Flux ring 702 is made of soft magnetic material, such as cold rolled steel. Flux ring 702 has a plurality of inwardly extending anchors/flux spreaders. Magnets 704 are affixed to flux ring 702 by placing magnets 704 in flux ring 702 between adjacent anchors/flux spreaders 706 and molding plastic around magnets 704 and anchors/flux spreaders 706 to form plastic molding 703. Plastic molding 703 secures magnets 704 to flux ring 702. Again magnets 704 are not magnetized when placed in flux ring 702 or lightly magnetized.

Figure 26:
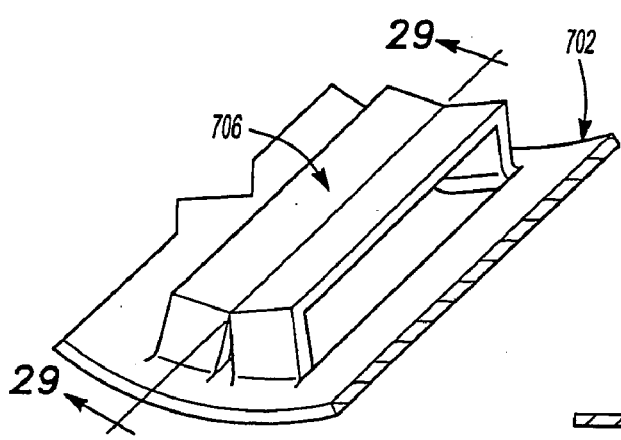
FIG. 26 is a perspective view of a section of the flux ring of FIG. 25 with an anchor/flux spreader.
Figure 29:
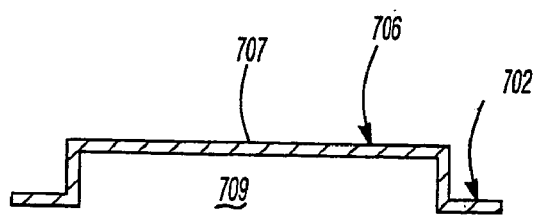
FIG. 29 is a side view taken along the line 29—29 of FIG. 26.

Flux ring 702 is illustratively formed to include an anchor/flux spreader 706 disposed adjacent each magnet 704. Flux ring 702 is illustratively formed by stamping a sheet metal blank and rolling the stamped sheet metal to form flux ring 702. Each anchor/flux spreader 706 is illustratively formed as part of the stamping operation. With reference to FIG. 26, each anchor/flux spreader 706 is an inwardly extending arcuate rectangular shaped segment that is illustratively stamped into flux ring 702 when stamped sheet metal blank 710 is stamped from the sheet metal blank. As shown in FIG. 29, a top segment 707 of anchor/flux spreader 706 is spaced from flux ring 702 to provide space 709 underneath top segment 707 through which plastic can flow during the molding process.

Anchors/flux spreaders 706 perform three functions. First, they locate magnets 704 for the plastic molding operation. Second, they assist in retaining the plastic molding 703 to flux ring 702 in that the plastic flows around (including beneath) each anchor/flux spreader 706 in the injection molding operation. Third, they act to provide a more continuous magnetic field as seen by the motor armature, such as armature 40 (FIG. 1). Anchors/flux spreaders 706 smooth out the discontinuities in the magnetic field that arise when multiple spaced apart magnets are used for a pole that would otherwise cause high frequency losses in the laminations of the armature. In addition, the anchors/flux spreaders 706 more evenly distribute the flux field to reduce localized saturation in the armature laminations which would otherwise reduce the total flux.

Figure 27:
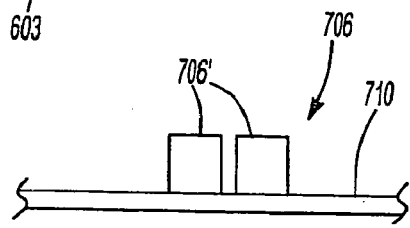
FIG. 27 is a side view of a stamped blank that is rolled to form a flux ring.
Figure 28:
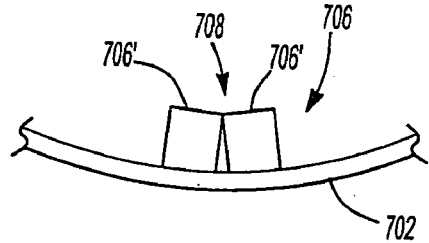
FIG. 28 is an end view of a section of a flux ring rolled from the stamped metal blank of FIG. 27 with an anchor having one lengthwise split.

The width of each anchor/flux spreader 706 can be varied depending upon the magnetic design requirements (width and spacing). Accordingly, each anchor/flux spreader 706 can be thin or wide. Similarly, the height of each anchor/flux spreader 706 can be varied. However, the wider an anchor/flux spreader 706, the more difficult it is to manufacture it because of the difficulty in maintaining roundness when the stamped sheet metal is rolled to form flux ring 702. To overcome this, an anchor/flux spreader 706 can be discontinuous across its width as shown at 708 in FIG. 27, such as being formed of multiple segments 706' as shown in FIG. 27. When the flux ring 702 is formed by rolling stamped sheet metal blank 710, segments 706' are brought close together and act as a single anchor/flux spreader.

In an alternative, the plastic used to mold the plastic molding, such as plastic molding 703, can have ferromagnetic additives. The plastic molding molded out of such plastic then also functions as a flux spreader.

Figure 30:
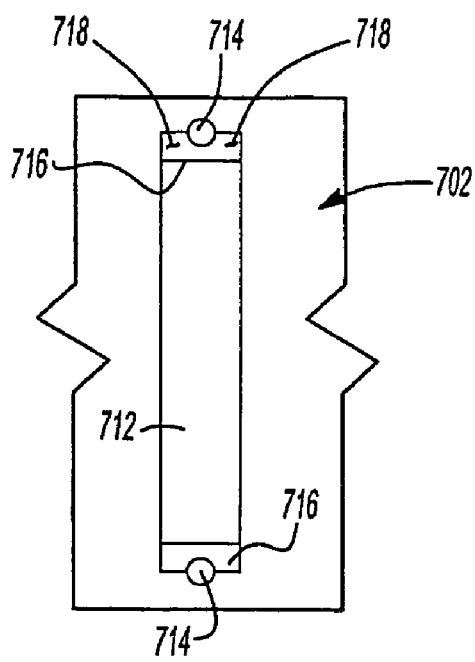
FIG. 30 is a top view of the flux ring of FIG. 26 with holes formed at bases of base sections of the anchor.
Figure 31:
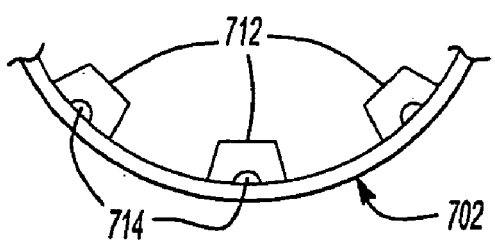
FIG. 31 is an end view of a section of the flux ring of FIG. 30.

Turning to FIGS. 30 and 31, a variation of anchor/flux spreader 706 is shown. In the variation of FIGS. 30 and 31, flux ring 702 has a plurality of anchors/flux spreaders 712. Anchor/flux spreaders 712 have the same shape as anchor/flux spreader 706 but with holes 714 at base ends 716 of each flux spreader 712 where each flux spreader 712 joins flux ring 702. Holes 714 facilitate the rolling of the stamped sheet metal blank to form flux ring 702. With holes 714, roundness can be maintained for a wider flux spreader 712 when the stamped sheet metal blank is rolled to form flux ring 702.

Holes 714 also enhance the magnetic characteristics of flux spreader 712. Holes 714 act as a magnetic chokes to prevent short circuiting of magnets 704 to themselves. Holes 714 cause the bases 716 of each anchor/flux spreader 712 to become areas of magnetic saturation 718. Holes 714 can be sized to minimize short circuiting of magnets 704 while increasing manufacturability of anchors/flux spreaders 712 and thus the manufacturability of flux ring 702.

Figure 32:
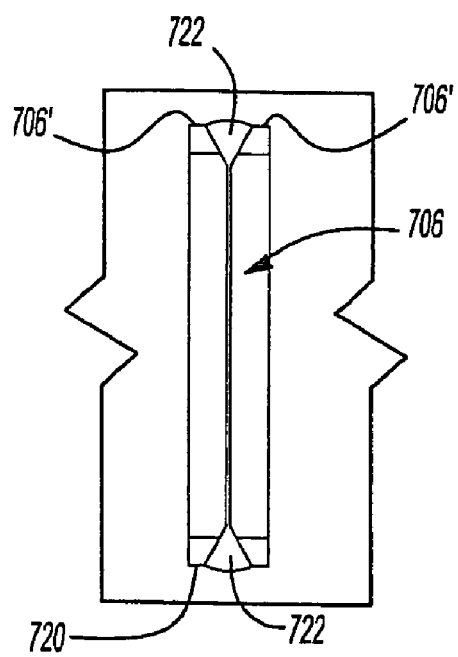
FIG. 32 is a top view of the flux ring of FIG. 28 with holes formed at bases of base sections of the anchor.
Figure 33:
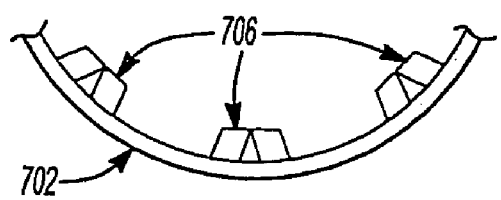
FIG. 33 is an end view of a section of the flux ring of FIG. 32.

FIGS. 32 and 33 show a modification to anchors/flux spreaders 706 of FIG. 27 to provide a similar choke function. When flux spreaders 706' are formed, material is removed from bases 720 of flux spreaders 706' where flux spreaders 706' join flux ring 702 leaving choke holes 722. Choke holes 722 provide a choke function in the same way as holes 714.

Figure 34:
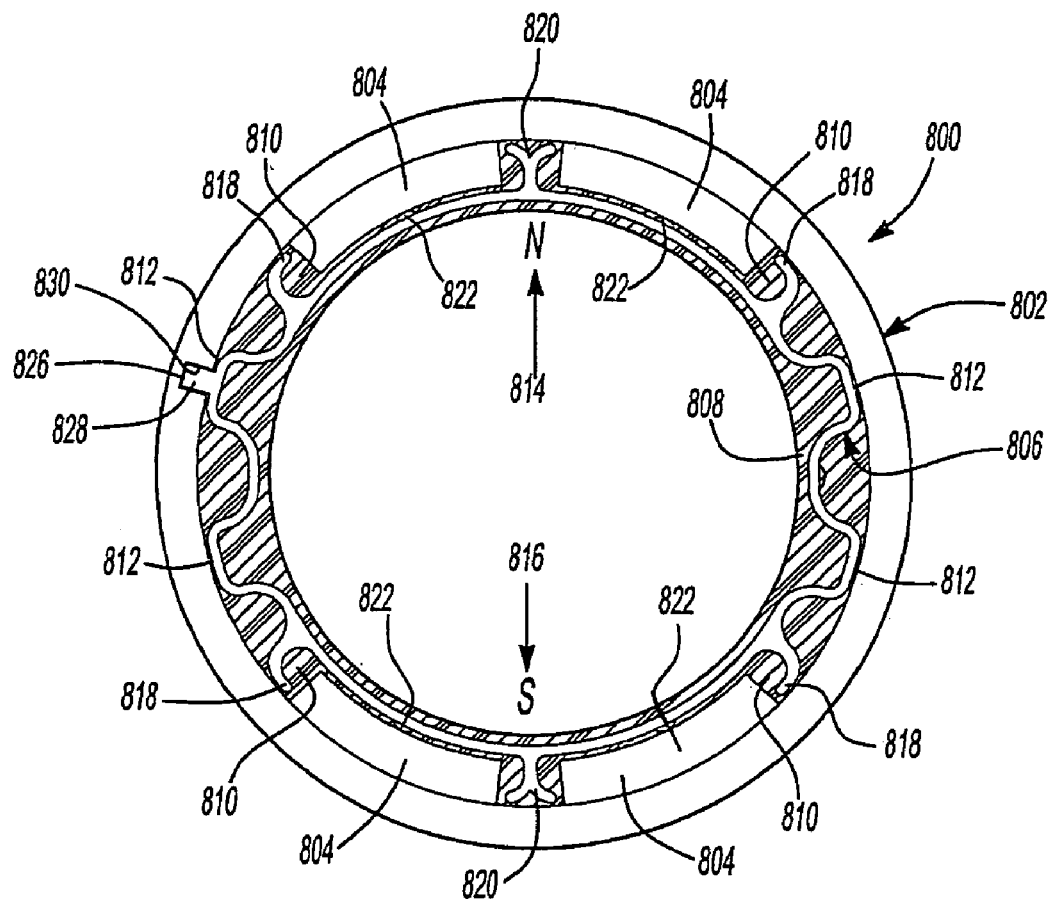
FIG. 34 is a cross-section view of a cylinder, magnet and assembly ring assembly for a stator of a direct current motor in accordance with an aspect of the invention.
Figure 35:
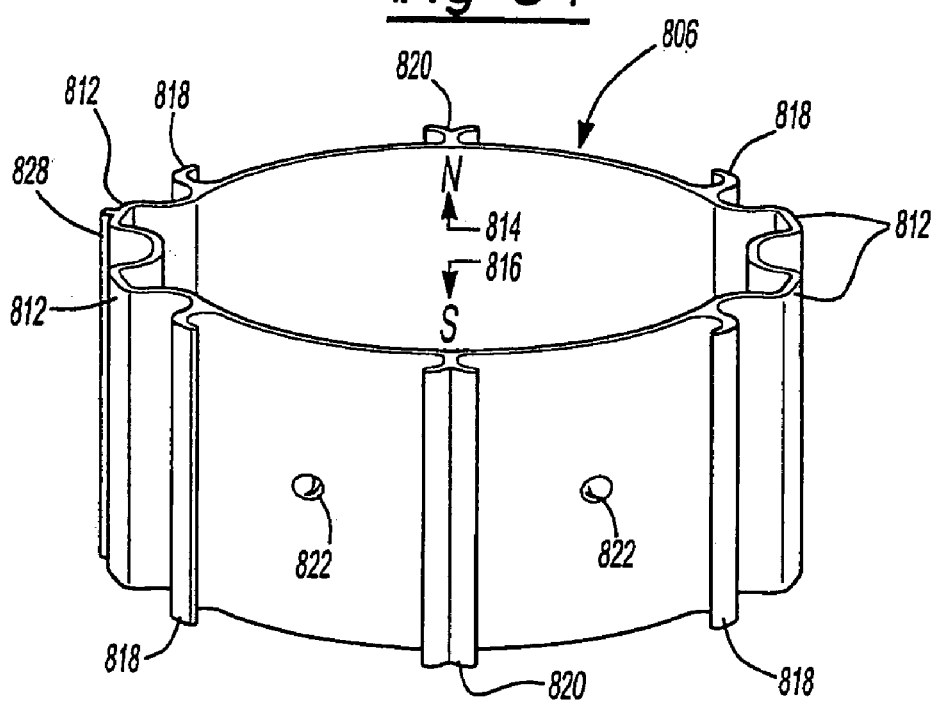
FIG. 35 is a perspective view of the assembly ring of FIG. 34.

Turning to FIGS. 34 and 35, another aspect of the invention is shown. In FIGS. 34 and 35, a cylinder/magnet assembly, illustratively a motor can (or stator housing)/magnet assembly 800, has a cylindrical stator housing or motor can 802, magnets 804, an assembly ring 806, and a plastic molding 808 molded around assembly ring 806 and magnets 804 that secures assembly ring 806 and magnets 804 to motor can 802. Motor can 802 is made of soft magnetic material, such as cold rolled steel. In the embodiment shown in FIGS. 34 and 35, north pole 814 and south pole 816 of motor can/magnet assembly 800 each have two magnets 804. It should be understood, however, that north and south poles 814 and 816 can have other than two magnets 804. It should be understood that motor can 802 could alternatively be a flux ring, such as flux ring 602 (FIG. 14).

Assembly ring 806 has outwardly projecting lands 812. Assembly ring 806 also has outwardly projecting outer fingers 818 and central finger 820 for each of north pole 814 and south pole 816. In the embodiment of FIGS. 34, 35, assembly ring 806 has two magnet pockets 810 for north pole 814 and two magnet pockets 810 for south pole 816. Outer fingers 818 are generally C shaped and central finger 820 is generally back-to-back C shaped. Each C shaped outer finger 818 opens to one of the back-to-back C shapes of central finger 820, with one of the magnet pockets 810 defined therebetween.

Assembly ring 806 is illustratively a molded plastic part, molded from a plastic material that has a sufficiently high melting point that it won't be affected by the molding process where plastic molding 808 is molded. Alternatively, assembly ring 806 can be a cast metal part.

In the manufacture of motor can/magnet assembly 800, assembly ring 806 is placed in motor can 802, preferably with a slip fit. Magnets 804 are then inserted in magnet pockets 810 and plastic molded around magnets 804 and assembly ring 806 to secure magnets 804 and assembly ring 806 to motor can 802. Motor can 802 and assembly ring 806 are dimensioned so that magnets 804 will be held in place until plastic molding 808 is molded. This allows for the preassembly of motor can 802, magnets 804 and assembly ring 806, obviating the need to assemble them within the injection mold. To simplify assembly and help ensure that magnets 804 stay in place prior to molding, retention bumps 822 are provided on assembly ring 806 that press up against magnets 804.

Assembly ring 806 is illustratively keyed at 826 so that magnets 804 are positioned in motor can 802 for the proper commutation angle. Keying also prevents magnets 804, assembly ring 806 and plastic molding 808 from turning in motor can 802 after plastic molding 808 hardens after molding. As is known, plastic typically shrinks as it hardens after injection molding and plastic molding 808 thus tends to pull away from motor can 802 due to the shrinkage.

The keying at 826 can illustratively be provided by assembly ring 806 having one or more outwardly projecting keys 828 with motor can 802 have a corresponding keyway 830 for each key 828. Alternatively, motor can 802 could have key 828 and assembly ring 806 could have keyway 830. In another alternative, motor can 802 and assembly ring 806 could each have keys 828 and keyways 830. In another alternative, motor can 802 and assembly ring 806 could each have one or more corresponding keyways 830 with plastic filling the corresponding keyways 830 in the motor can 802 and assembly ring 806 to provide the keying. The last alternative, however, would not position magnets 804 in motor can 802 for the proper commutation angle.

After preassembly, motor can 802, magnets 804 and assembly ring 806 are placed in the injection mold and plastic injected around magnets 804 and assembly ring 806, forming plastic molding 808 which secures assembly ring 806 and magnets 804 to motor can 802. Again, magnets 804 are illustratively not magnetized when placed in assembly ring 806, or lightly magnetized.

Figure 36:
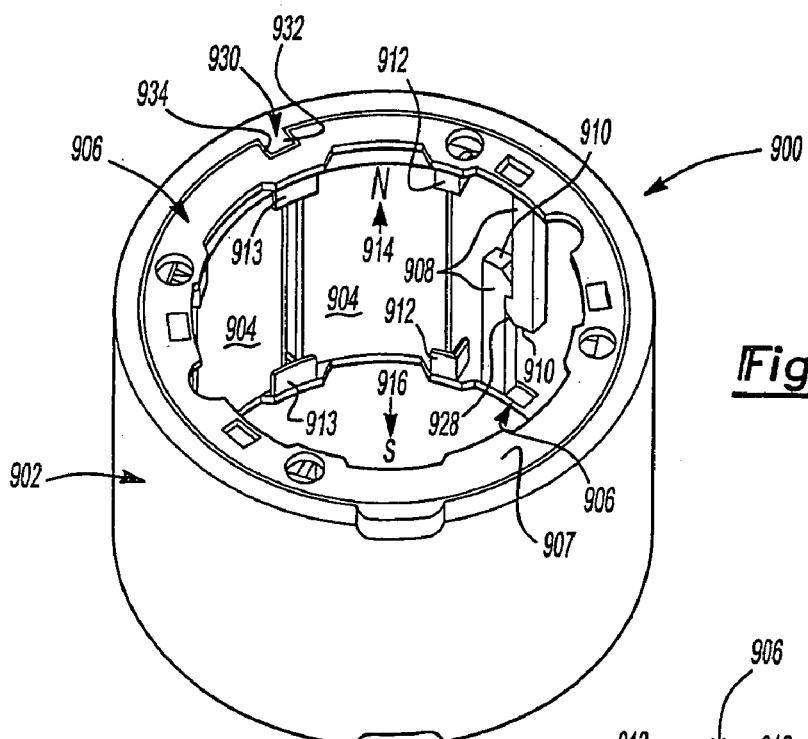
FIG. 36 is a perspective view of a cylinder, magnet and assembly ring assembly for a stator of a direct current motor in accordance with an aspect of the invention.
Figure 37:
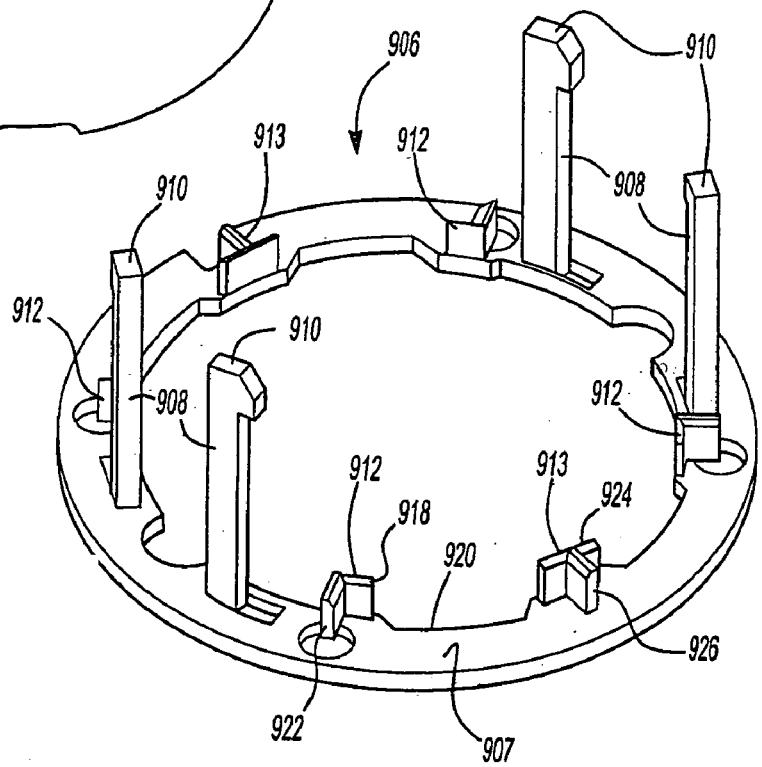
FIG. 37 is a perspective view of an assembly ring of FIG. 36.

Turning to FIGS. 36 and 37, another aspect of the invention is shown. A cylinder/magnet, illustratively a motor can (stator housing)/magnet assembly 900 has a cylinder, such as a motor can (stator housing) 902, magnets 904, a molding of plastic (not shown in FIG. 36 for purposes of clarity), similar to plastic molding 808 of FIG. 34, and two matable assembly rings 906. Motor can 902 is made of soft magnetic material, such as cold rolled steel. It should be understood that motor can 902 could also be a flux ring, such as flux ring 602 (FIG. 14). Matable assembly rings 906 are illustratively molded plastic parts made from a plastic having a sufficiently high melting temperature so that it is not affected by the molding process that secures assembly rings 906 and magnets 904 to motor can 902.

Each assembly ring 906 includes a base ring 907 with a plurality of legs 908 extending axially (with respect to motor can 902) therefrom. Each leg 908 of an assembly ring 906 has a hooked distal end 910 that extends toward a corresponding hooked distal end of a corresponding leg 908 of the other assembly ring 906 when the two assembly rings 906 are mated. Legs 908 of the two assembly rings 906 thus comprise anti-symmetric snap locks 928. Assembly rings 906 are illustratively identical.

Motor can/magnet assembly 900 illustratively has two magnets 904 for north pole 914 and two magnets 906 for south pole 916. Each assembly ring 906 will thus have outer magnet retainers 912 and central magnet retainer 913 for each of north pole 914 and south pole 916. Outer magnet retainers 912 are illustratively truncated L shaped segments, with a first leg 918 disposed along an inner radius 920 of base ring 907 of assembly ring 906 and a second leg 922 extending transversely across base ring 907 of assembly ring 906. Central magnet retainer 913 is illustratively a T shaped segment, with the top 924 of the T disposed along inner radius 920 of base ring 907 of assembly ring 906 and the leg 926 of the T extending transversely across base ring 907 of assembly ring 906.

It should be understood that north pole 914 and south pole 916 can have other than two magnets 904. In such case, a central magnet retainer 913 would be disposed between the adjacent magnets 904 of each of north pole 914 and south pole 916.

In assembling motor can/magnet assembly 900, one of assembly rings 906 is placed in one end of motor can 902. Magnets 904 are then placed on base ring 907 of that assembly ring 906 between outer magnet retainers 912 and central magnet retainer 913. The second assembly ring 906 is then placed into the opposite end of motor can 902. Hooked distal ends 910 of legs 908 of assembly rings snap together as the second assembly ring 906 is inserted fully into motor can 902 and mates with the first assembly ring 906. Assembly rings 906 secure magnets 904 and assembly rings 906 in motor can 902 for the molding process. Again, magnets 904 are not magnetized when placed in the first assembly ring 906, or lightly magnetized.

At least one assembly ring 906 is keyed to motor can 902 at 930 for the reasons discussed above with respect to FIG. 34. In this regard, motor can 902 can include one or more inwardly projecting keys 932 with at least one of assembly rings 906 having a corresponding keyway 934 for each key 932. Alternatively, one or both of assembly rings 906 could have one or more keys 932 with motor can 902 having the corresponding keyways 934. In another alternative, the motor can 902 and at least of assembly rings 906 could each have keys 932 and corresponding keyways 934. In another alternative, the motor can 902 and at least one of assembly rings 906 could have corresponding keyways 934 with the plastic filling in the corresponding keyways during the molding of the plastic to provide the keying.

The subassembly of motor can 902, magnets 904 and assembly rings 906 is now ready for the molding process. The subassembly is placed in a mold, such as an injection mold, and plastic injected around magnets 904 and assembly rings 906 to secure magnets 904 and assembly rings 906 to motor can 902. Illustratively, plastic is molded so that it extends out over base rings 907 of assembly rings 906 and over the ends of motor can 902.

Figure 38:
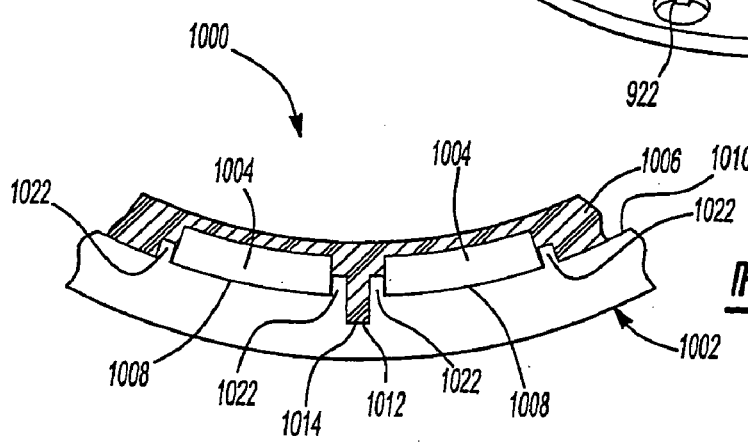
FIG. 38 is a cross-section view of a section of a cylinder with magnet pockets and magnets for a stator of a direct current motor in accordance with an aspect of the invention.

Turning to FIG. 38, another variation of the invention is shown. Cylinder/magnet assembly, illustratively a motor can (stator housing)/magnet assembly 1000, has a cylinder, such as a cylindrical stator housing or motor can 1002, magnets 1004 and a plastic molding 1006 molded around magnets 1004 that secures magnets 1004 to motor can 1002. Motor can 1002 is made of soft magnetic material, such as cold rolled steel. Motor can 1002 is formed to have magnet receiving pockets 1008 in an inner surface 1010, illustratively, one magnet receiving pocket 1008 for each magnet 1004. Magnet receiving pockets 1008 are illustratively defined by pairs of spaced apart ridges 1022 extending axially along inner surface 1010 of motor can 1002. Illustratively, spaced apart ridges 1022 extend the axial length of motor can 1002. Motor can 1002 can be manufactured using a variety of manufacturing processes, such as extrusion, drawing, or powdered metal. Spaced apart ridges 1022 are illustratively formed as part of that manufacturing process. The depths of magnet receiving pockets 1008 are small enough to minimize magnetic leakages but large enough to assure positive location of magnets 1004 in motor can 1002. Illustratively, plastic is molded so that it is flush with the ends (not shown) of motor can 1002.

Pilot features are illustratively formed in at least one endwall 1018 of the plastic molding 1006 during the molding process. A pilot feature, as that term is used herein, is one or more projections or recesses formed in the endwall of plastic molding 1006 that mates with corresponding projections or recesses formed in one or both end plates 52, 54 (FIG. 1) for the motor to locate the end plate 52, 54 with respect to cylinder/magnet assembly 1000 when the end plates are affixed to the stator in which cylinder and magnet assembly 1000 is used. It should be understood that end plates 52, 54 can be a functional part of power tool 10, such as a gear case (not shown). For example, keyways 1016 (FIG. 38A) are molded in endwall 1018 of plastic molding 1006. Illustratively, a keyway 1016 is molded above each magnet 1004. Illustratively, one or more of keyways 1016 may be of different size for orientation purposes. It should be understood that more or less keyways 1016 than shown in FIG. 38A can be provided.

The end plate for the motor that includes the armature rotor shaft bearing, such as end plate 52 having bearing 56 (FIG. 1) is formed with corresponding keys which mates with keyways 1016 when end plate 52 is affixed to the stator in which cylinder and magnet assembly is used. The pilot feature of the end plate mates with the molded pilot feature to more accurately locate end plate 52, and thus bearing 56, with respect to cylinder/magnet assembly 1000. It should be understood that end plate 52 could have the keyway and cylinder/magnet assembly have the corresponding key. Further, multiple keys and keyways can be utilized, as well as other pilot features, such as posts and holes. It should be understood that molding pilot features in the plastic molding of the cylinder and magnet assembly can also be done in the other embodiments of the invention discussed herein.

In assembling motor can/magnet assembly 1000, magnets 1004 are placed in magnet receiving pockets 1008 in motor can 1002. To create a subassembly of motor can 1002 and magnets 1004 for subsequent molding, magnets 1004 can be temporarily glued in place in motor can 1002, or lightly magnetized so that they are self-retained to motor can 1002. By lightly magnetizing magnets 1004 before plastic is molded, magnets 1004 hold themselves up against inner surface 1010 of motor can 1002, preventing or at least minimizing plastic from flowing between magnets 1004 and inner surface 1010 of motor can 10012.

Magnet receiving pockets 1008 locate magnets 1004 on motor can 1002 and keep them from moving side to side during the molding process. The subassembly of motor can 1002 and magnets 1004 is then placed in a mold, such as an injection mold, and plastic molded around magnets 1004 to secure them to motor can 1002.

Motor can 1002 may also have interlocking/keying features to retain plastic molding 1006 to motor can 1002. For example, motor can 1002 may have at least one interlock slot 1012 formed in inner surface 1010. Plastic will then flow into each interlock slot 1012 during the molding process forming in each interlock slot 1012 a corresponding interlock projection or key 1014 as part of plastic molding 1006. Interlock projection 1014 molded into interlock slot 1012 prevents plastic molding 1006 from rotating in motor can 1002. Spaced apart ridges 1022 also act to interlock plastic molding 1006 to motor can 1002.

Cylinder/magnet assembly 1000 includes through holes 1024 for bolts (not shown) that hold motor end plates 52, 54 (FIG. 1) together. Through holes 1024 are partially formed in inner surface 1010 of motor can 1002, the rest of through holes 1024 being formed during the molding process. Partially forming through holes 1024 in inner surface 1010 of motor can 1002 permits a greater thickness of plastic to be disposed between through holes 1024 and an inner surface 1026 of plastic molding 1006 than if all of through holes 1024 were formed in plastic molding 1006 when plastic molding 1006 is molded.

Plastic molding 1006 can illustratively be formed with slots 1020 to provide for increased air flow through cylinder/magnet assembly 1000 after it is assembled into a motor and power tool. Slots 1020 also allow for uniform wall thickness of the plastic, in the same manner as discussed above with respect to FIG. 14. Slots 1020 are illustratively formed in plastic molding 1006 between adjacent magnets 1004 of each pole and between each magnet 1004 and the through hole 1024 to which that magnet 1004 is adjacent.

Turning to FIG. 39, cylinder/magnet assembly, illustratively a flux ring/magnet assembly 1100, has a cylinder, such as a flux ring 1102, and a plurality of magnets 1104. It should be understood that flux ring 1102 could alternatively be a stator housing or motor can. Flux ring 1102 is made of soft magnetic material, such as cold rolled steel. A north pole 1106 of cylinder/magnet assembly 1100 illustratively has four magnets 1104 as does south pole 1108. It should be understood, however, that north and south poles 1106 in 1108 can have other than four magnets 1104. Magnets 1104 are illustratively, sintered Neo magnets as described above.

To reduce vibration and the resultant audible noise, the distribution or included angles 1110, 1112 of north and south poles 1106, 1108 are different. The distribution or included angle of a pole is the arcuate angle between the outer edges of the outer magnets 1104 of the pole. Each magnet 1104 has the same volume of magnet material and are illustratively the same size. The different distribution angles of the north and south poles 1106, 1108 reduce audible noise. This reduction occurs because the different distribution angles of the north and south poles 1106, 1108 result in a smaller radial force ripple.

The smaller radial force ripple results in less vibration, while the additional permanently biased radial force that also results only causes increased load on the bearing of the motor rotor shaft. (Permanently biased radial force is the bias force caused by a stronger magnetic field in one pole as opposed to the other.)

Turning to FIG. 40, another aspect of the invention is shown. In FIG. 40, cylinder/magnet assembly, illustratively a flux ring/magnet assembly 1120, has a cylinder, such as flux ring 1122. Flux ring 1122 is made of soft magnetic material, such as cold rolled steel. It should be understood that flux ring 1122 could alternatively be a motor can (stator housing). A north pole 1128 of flux ring/magnet assembly 1120 has a plurality of magnets 1124. The south pole 1130 of flux ring/magnet assembly 1120 has a plurality of magnets 1126. The number of magnets 1124 of north pole 1128 is different than the number of magnets 1126 of south pole 1130. Magnets 1124 and 1126 are sized differently so that the total volume of magnetic material of magnets 1124 is equal to the total volume of magnetic material of magnets 1126. The different numbers of magnets 1124 of north pole 1128 and magnets 1126 of south pole 1130 results in a different distribution of magnetic force in north pole 1128 than in south pole 1130. This reduces audible noise by reducing D force ripple. Distribution angles 1130, 1132 of north pole 1128 and south pole 1130 are illustratively equal. Distribution angles 1130, 1132 may, however, be unequal as described above.

Turning to FIG. 41, a cylinder/magnet assembly 1200 for a field assembly, such as a rotor, of a brushless electric machine is shown. Cylinder/magnet assembly 1200 includes a cylinder 1202 illustratively made of soft magnetic material such as cold rolled steel. Cylinder 1202 has anchors 1208 projecting outwardly from an outer surface 1205. Magnets 1204 are disposed around outer surface 1205 of cylinder 1202 and a plastic molding 1206 secures magnets 1204 to cylinder 1202. Cylinder/magnet assembly 1200 is formed by placing cylinder 1202 with magnets disposed around its outer surface 1205 in a die in an injection molding machine (not shown) and injection molding plastic therein to form plastic molding 1206 around magnets 1204 and anchors 1208. Anchors 1208 also serve to locate magnets 1204 on cylinder 1202 for subsequent molding. Magnets 1204 are illustratively not magnetized when placed on outer surface 1205 of cylinder 1202 or lightly magnetized so that they hold themselves in place. Magnets 1204 are then fully magnetized in a subsequent operation.

The aspect of the invention shown in FIGS. 38 and 38A could similarly be modified for use in a rotor. In this regard, magnet receiving pockets 1008 would be formed in an outer surface of cylinder 1002 and spaced apart ridges 1022 would project outwardly for that outer surface, defining the magnet receiving pockets therebetween. For example, with reference to FIG. 41, spaced apart ridges 1022 would replace anchors 1208. Magnets, such as magnets 1204, would then be secured in such magnet receiving pockets by the molding of plastic around magnets 1204.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of making a cylinder and magnet assembly for a stator of an electric machine, comprising:
    (a) stamping a blank to form anchors extending upwardly from a surface of the blank and stamping holes in the blank where first and second portions of the anchors meet an inner surface of the cylinder to facilitate rolling of the cylinder from the blank;
    (b) rolling a cylinder from the stamped blank with the anchors projecting radially inwardly;
    (c) placing magnets around an inner surface of the cylinder; and
    (d) molding plastic around the magnets and the anchors to secure the magnets to the cylinder.

2. The method of claim 1 wherein stamping the blank includes stamping the blank so that each anchor has at least one lengthwise split to facilitate the rolling of the blank to form the flux ring.

3. The method of claim 1 including stamping the anchors to form them as flux spreaders.

4. The method of claim 1 including stamping the blank to include an inwardly projecting stop tab for each magnet and placing the each magnet up against a respective one of the stop tabs to locate them axially on the inner surface of the cylinder.

5. A method of making a flux ring and magnet assembly for a stator of a motor, comprising:
    (a) stamping a blank from a soft magnetic material to have a plurality of first and second rectangularly shaped spaced apart anchors projecting therefrom, each anchor formed to have first and second portions projecting from the blank and a third portion spaced from a surface of the stamped blank and extending between the first and second portions with holes at bases of the first and second portions, (b) rolling the stamped blank to form the flux ring so that the anchors extend radially inwardly from an inner surface of the flux ring; the holes facilitating the rolling of the stamped blank and acting as magnetic chokes;

(c) placing magnets between the first and second spaced apart anchors to locate the magnets on the inner surface of the flux ring; and (d) molding plastic around the magnets and the anchors to secure the magnets to the flux ring.

6. The method of claim 5 wherein stamping the blank includes stamping the blank so that each anchor has at least one lengthwise split to facilitate the rolling of the blank to form the flux ring.

7. The method of claim 5 including stamping the anchors to form them as flux spreaders.

8. A cylinder and magnet assembly for a field assembly of an electric machine having at least one pair of north and south poles, comprising:

(a) a cylinder having a surface with anchors projecting therefrom;

(b) each pole having a plurality of magnets secured to the surface of the cylinder by a molding of plastic molded around the magnets and the anchors; and (c) the anchors formed as flux spreaders with at least one anchor disposed between adjacent magnets of each pole.

9. The assembly of claim 8 wherein the field assembly is a stator and each anchor includes first and second opposed portions extending inwardly from the inner surface of the cylinder and a third portion extending between the first and second opposed portions that is spaced inwardly from the inner surface of the cylinder, the third portion extending transversely across the cylinder for substantially an entire length of the magnet to which it is adjacent.

10. The assembly of claim 9 wherein the cylinder and the first and second portions of each anchor have holes where bases of the first and second portions of each anchor meet the inner surface of the cylinder, the holes acting as magnetic chokes.

11. A cylinder and magnet assembly for a field assembly of an electric machine having at least one pair of north and south poles, comprising:

(a) a cylinder having a surface with anchors projecting therefrom;

(b) each pole having a plurality of magnets secured to the surface of the cylinder by a molding of plastic molded around the magnets and the anchors; and (c) a flux spreader disposed across inner surfaces of the magnets of each pole and secured in the cylinder by the molding of plastic.

12. The assembly of claim 11 wherein each flux spreader is a soft magnetic material segment shaped as an arcuate segment of a cylinder with radially outwardly extending flanges at each end thereof, each flux spreader having a width that is substantially the same as a length of the magnets.

13. The assembly of claim 11 wherein the electric machine is an electric motor and the field assembly is a stator.

14. An electric motor, comprising an armature and a stator, the stator having at least one north and south pole, the stator including a cylinder having anchors formed as flux spreaders projecting radially inwardly therefrom and each pole having a plurality of magnets secured to the surface of the cylinder by a molding of plastic molded around the magnets and the anchors, at least one anchor disposed between adjacent magnets of each pole.

15. The apparatus of claim 14 including holes in the cylinder where bases of each anchor meet the cylinder, the holes acting as magnetic chokes.

16. A power tool, comprising:

(a) a housing;

(b) a motor disposed within the housing, the motor including a stator and an armature, the stator having at least a north pole and a south pole and a cylinder, the cylinder having a surface with anchors formed as flux spreaders projecting therefrom, each pole having a plurality of magnets secured to the surface of the cylinder by a molding of plastic molded around the magnets and the anchors, at least one anchor disposed between adjacent magnets of each pole;

(c) a power source; and (d) an actuator member electrically coupled between the motor and the power source for energizing and deenergizing the motor.

17. The apparatus of claim 16 including holes in the cylinder where bases of each anchor meet the cylinder, the holes acting as magnetic chokes.

18. An electric motor, comprising an armature and a stator, the stator having at least one pair of north and south poles, the stator including a cylinder having a surface with anchors projecting therefrom, each pole having a plurality of magnets secured to the surface of the cylinder by a molding of plastic molded around the magnets and the anchors, and a flux spreader disposed across inner surfaces of the magnets of each pole and secured in the cylinder by the molding of plastic.

19. The apparatus of claim 18 wherein each flux spreader is a soft magnetic material segment shaped as an arcuate segment of a cylinder with radially outwardly extending flanges at each end thereof, each flux spreader having a width that is substantially the same as a length of the magnets.

20. A power tool, comprising:

(a) a housing;

(b) a motor disposed within the housing, the motor including a stator and an armature, the stator having at least a north pole and a south pole and a cylinder, the cylinder having a surface with anchors projecting therefrom, each pole having a plurality of magnets secured to the surface of the cylinder by a molding of plastic molded around the magnets and the anchors, a flux spreader disposed across inner surfaces of the magnets of each pole and secured in the cylinder by the molding of plastic;

(c) a power source; and (d) an actuator member electrically coupled between the motor and the power source for energizing and deenergizing the motor.

21. The apparatus of claim 20 wherein each flux spreader is a soft magnetic material segment shaped as an arcuate segment of a cylinder with radially outwardly extending flanges at each end thereof, each flux spreader having a width that is substantially the same as a length of the magnets.

* * * * *

UNITED STATES PATENT AND TRADEMARK OFFICE
CERTIFICATE OF CORRECTION

| | | |
|---|---|---|
| PATENT NO. | : 7,091,642 B2 | |
| APPLICATION NO. | : 11/113429 | |
| DATED | : August 15, 2006 | |
| INVENTOR(S) | : Michael Agnes et al. | |

It is certified that error appears in the above-identified patent and that said Letters Patent is hereby corrected as shown below:

<u>Title Page</u>,
Item [75] Inventors, line 6, "Richard H. Walter" should be -- Richard T. Walter --.
Line 7, "Ren T. Wang" should be -- Ren H. Wang --.
Line 8, insert --Jiaqi Zhang, Cockeysville, MD (US)--.

Signed and Sealed this

Third Day of July, 2007

JON W. DUDAS
*Director of the United States Patent and Trademark Office*